United States Patent [19]

Mead et al.

[11] 3,899,772

[45] Aug. 12, 1975

[54] MOBILE COMPUTER TERMINAL AND SYSTEM

[75] Inventors: Alan B. Mead; John L. Aker; David A. Malan, all of Chanute; John R. Alden, Olathe, all of Kans.

[73] Assignee: Kustom Electronics, Inc., Chanute, Kans.

[22] Filed: Apr. 23, 1973

[21] Appl. No.: 353,509

[52] U.S. Cl. .................. 340/152; 325/53; 340/324 R

[51] Int. Cl. .................................................. G06f 3/14

[58] Field of Search ............................ 340/152–154, 340/324 R, 172.5; 325/52, 53, 55; 343/177, 225–228

[56] References Cited

UNITED STATES PATENTS

| | | | |
|---|---|---|---|
| 3,210,665 | 10/1965 | Street | 343/177 |
| 3,281,789 | 10/1966 | Willcox et al. | 340/172.5 |
| 3,376,509 | 4/1968 | Willcox et al. | 343/177 |
| 3,714,574 | 1/1973 | Baba et al. | 343/177 |

*Primary Examiner*—Marshall M. Curtis
*Attorney, Agent, or Firm*—Lowe, Kokjer, Kircher, Wharton & Bowman

[57] ABSTRACT

The disclosed two-way mobile digital communications system includes a plurality of remote terminal units, a programmable terminal controller operable to manipulate stored data from a plurality of local or remote computer files on command from any or all of the mobile terminal units in operational locations, and a network for communication between the central data processing station and the mobile terminal units. A high speed audio phase shift keyed transmission method has absolute phase referencing. Each of the remote terminals include a low-voltage solid state plasma screen which displays dot matrix characters. The buffer memory therein allows uninterrupted message composition and incoming message storage which the terminal controller insures the compatability of the remote terminal units with existing data bases and controls data transfer between the terminal units and for between the units and the computer data base.

18 Claims, 14 Drawing Figures

PATENTED AUG 12 1975

3,899,772

SHEET 10

MOBILE COMPUTER TERMINAL AND SYSTEM

BACKGROUND AND BRIEF DESCRIPTION

The subject invention relates to remotely controlled mobile terminals and relates sytems which can, via a command and control center, effect increased control over remote operational activity of field units. Information vital to a complex operation now can be exchanged, received, or transmitted, and more importantly the status of a field unit can be monitored more accurately from the central control center.

One very significant application of this new technology pertains to the field of law enforcement. Law enforcement operations must provide the officer on patrol with rapid responses to his queries about people, vehicles, and property. Accurate and timely response information is valuable both for the safety of the police officer and for the protection of the citizen from unnecessary detention. Law enforcement agencies that have collected vasts amounts of data on criminals may now make this data available via in-house computer terminals. However, a common problem is how to give the officer on patrol direct and accurate access to a criminal data base.

Early efforts to solve this problem involved providing dispatchers with computer terminals so that they could respond to inquiries made by officers on patrol. In such systems, patrol officers called in requests by radio to the dispatcher who manually entered the request into an in-house computer and then relayed the information vocally by radio back to the field officer. This procedure was found to be awkward and involved unacceptable delay. The first significant step forward to provide prompt response was the "mobile teleprinter", a one-way digital system printer which speeded up message flow from dispatcher to cruiser. However, it did not substantially reduce the bulk of the communication load since all messages from the mobile units to the dispatcher were transmitted by voice. A later improvement incorporated the "status box" which increased the transmission of routine message originating in mobile units. However, message repertoire was limited to predefined status identifications, "Ten Codes," and emergency alarms. Also, voice communication was still required for non-routine inquiry and dispatcher originated messages. The latest improvement prior to this invention was the two-way digital terminal which combined a typewriter-like keyboard, status keys, and a small CRT display screen. However, these units had limited message capacity, slow speed, conventional transmission technique, and minimal buffering. Furthermore, the CRT display screen made the units heavy, bulky, and subject to high voltage shock and implosion hazards.

My improved system includes a plurality of remote mobile terminals units adapted to transmit and receive digital information over an existing communications network in cooperation with a central data processor station having a special purpose terminal controller programmed to manipulate stored date from a plurality of local or remote files on command from the remote mobile terminal units in operational locations. In typical system installations, it is anticipated tha the data files and the communications network will be established and maintained by the user, or customer, and that the remote terminal units will be integrated into the established communication and computer system by a terminal controller. For example, typical law enforcement installations include a base station VHF communications facility and access to data files and/or computers either on site or at some remote location. The mobile terminal units may be installed in radio-equipped patrol cars with the terminal controller installed as an interface between the dispatcher radio and the local or remote computer(s) thusly providing field units with direct access to data files, as well as providing for rapid dispatcher-originated communications.

Terminal Controller

On a functional basis, the terminal controller insures transmission to the proper remote terminal or group of terminals, checks messages for errors, and automatically retransmits messages when not properly received. The terminal controller also automatically polls the mobile terminal units for operational status, controls data transfer to and from the modulator-demodulator, and controls data transfer to the central processing unit. The terminal controller has the capability of relaying information to some mobile terminals while simultaneously receiving information from others such as when a single full duplex radio channel is used. The terminal controller may also service multiple simplex of full duplex radio channels simultaneously. This increases its capability to service the maximum number of terminals and achieves optimum utilization of the communication system.

For optimum operation, mobile terminal systems must take into account the following considerations: retransmissions due to transmission errors and capability to retransmit, dynamic terminal activity, and contention requirements of a multiple-user communications system. These functions are implemented entirely within the terminal controller which in turn relieves the customer's CPU of the functions relating to the control of the communications channel.

The terminal controller also provides system timing and buffering to insure that remote terminals are compatable with existing customer equipment. System timing and buffering are provided by a modulator-demodulator which is specifically designed for two-way radios. Serial audio information is converted into serial digital data which then goes to a parallel converter that converts serial information into bit parallel characters which are decoded and processed into a form compatable with the customer's data base.

It is anticipated that the customer's data base will poll the terminal controller at a very high rate relative to the ditigal communication rate over the two-way radio, thereby minimizing the possibility that the terminal controller would build up a backlog of messages. Thus, incoming inquiries from a terminal unit are received and buffered for the short period of time before the next poll by the customer's data base. On the return of the answer to an inquiry, the terminal controller buffers the answer from the data base until such time as it can re-establish communication with the mobile unit that sent the inquiry. It re-transmits the message until it is received and acknowledged confirming reception of the answer.

Security and privacy concepts are enhanced by this invention. For example, digital transmission code is not audibly readable. Message accountability can be insured by system design. Security codes may be utilized, requiring operators to enter special codes for access to restricted data. In cases where a terminal is lost, the terminal hardware address can be deleted from the system, so that no future inquiries are accepted. Unique sign-on/sign-off controls can be used, and operator security codes can be assigned.

The mobile terminal is comprised of a keyboard, a solid-state display (not a CRT), a special purpose modulator-demodulator (modem), a control and memory unit, and, an internal power supply. The keyboard has full alphanumeric capability including special function keys (status, 10-XX, energizing, canned messages, etc.). The transmit key initiates all mobile-to-base transmissions of composed messages. The dispaly is a low-voltage, solid-state, dot-matrix panel. Since the display is not a cathode ray tube (CRT), it does not have the hazards of the CRT, such as implosion due to impact or the possibility of high voltage shock. The modem is a high-speed synchronous audio phase-shift-keyed system with exceptional noise immunity. The internal power supply, which generates regulated terminal voltages, is designed to receive primary D.C. power from a 10.5–15 volt automobile ignition system. The control and memory unit controls the refresh requirement of the display and all timing necessary to receive and transmit messages and status information.

One of the primary objects of the invention is to provide a versatile, easy to use multiple terminal system for rapid common efficient data transmission. It is an important feature of the invention that the system may be incorporated into the existing computer and communication facilities with a minimum of modification thereto.

Another object of the invention is to provide a uniquely constructed mobile terminal unit for utilization with the mobile terminal system mentioned above. It is a feature of the invention that the terminal unit is easy to operate and install as well as providing the user thereof with a fast and efficient tool for obtaining updated information from a large data base or for communicating with other mobile terminal units within the system.

Another object of the invention is to provide a mobile terminal unit of the character described having means for displaying the message to be transmitted prior to the operator initiated transmission of same.

A further object of the invention is to provide a mobile terminal unit of the character described wherein the operational status of the transmit and received logic is displayed on a "SELF-SCAN" (a trademark of the Burroughs Corporation) panel. It is a feaature of the invention that the bottom line of the SELF-SCAN panel display is used to indicate one or more of three potential operational states of the terminal unit.

A still further object of the invention is to provide a mobile terminal unit for utilization in a data transmission mobile terminal system including a means for transmitting a message from the terminal unit so as to maximize the possibility of getting the message to its destination. It is a feature of the invention that the transmitting means automatically waits for a radio channel to be free and randomly spaces adjacent transmissions so that the probability for interference with another terminal in the system is minimized.

A further object of the invention is to provide a uniquely constructed mobile terminal unit for utilization in a digital data terminal transmission system wherein the mobile terminal unit includes a means for transmitting function/status information from the terminal to a computer data base on command of the computer. It is an important feature that once a computer or data base has interrogated the mobile terminal, the received logic within the terminal indicates this fact to the terminal logic therein which initiates the transmission of an acknowledgement containing not only the status of the input buffer to the terminal but also the contents of the function and status latches within the display logic.

Another object of the invention is to provide a uniquely constructed modem for utilization with digital data trasnmission system including mobile terminal units, said modem including a unique means for transmitting both clock and data simultaneously in a single audio signal and to include a means for correctly phasing the clock signal to the transmitted carrier signal.

A further object of the invention is to provide in a modem of the character described, a means for rederiving the absolute reference for modulating and bit timing for the modulation from the received modulated signal and/or maintaining same during the duration of the transmission under high noise conditions.

A still further object is to provide a uniquely construced mobile terminal unit for use in a digital data terminal transmission system wherein the mobile terminal unit includes a means for transmitting only the meaningful data in a display memory without the operator manually entering a special character at the end of the text to indicate an end of message.

Another object of the invention is to provide a uniquely constructed mobile terminal unit for utilization in digital data transmission systems, said terminal unit including means for using only one key to alternately clear or display a message from the mobile terminal buffer memory.

Another object of the invention is to provide a unique modem for utilizaton with mobile terminal units, said modem including means for integrating received modulation to recover correct data under high noise conditions using a unique sampling method.

A further object of the invention is to provide a uniquely constructed mobile terminal unit for use in digital data transmission system wherein each mobile terminal may have an address card for identifying the particular operator to the computer data base. It is a feature of the invention that the address card is easily interchangeable with any terminal unit in the system.

A still further object of the invention is to provide a uniquely constructed modem for mobile computer terminal systems, said modem including a means for checking parity while using synchronized phase modulation, said means including a second means for independently checking each bit against an absolute phase reference.

Another object of the invention is to provide a mobile computer terminal unit that includes a unique means for indicating to an auxilliary device that the terminal unit is in standby thereby automatically permitting said standby device to receive information intended for the terminal unit.

Other and further objects of the invention, together with the features of novelty appurtenant thereto, will appear in the course of the following description.

DETAILED DESCRIPTION OF THE INVENTION

In the accompanying drawings, which form a part of the specification and are to be read in conjunction therewith and in which like reference numerals are employed to indicate like parts in the various views.

Figures 1, 2:
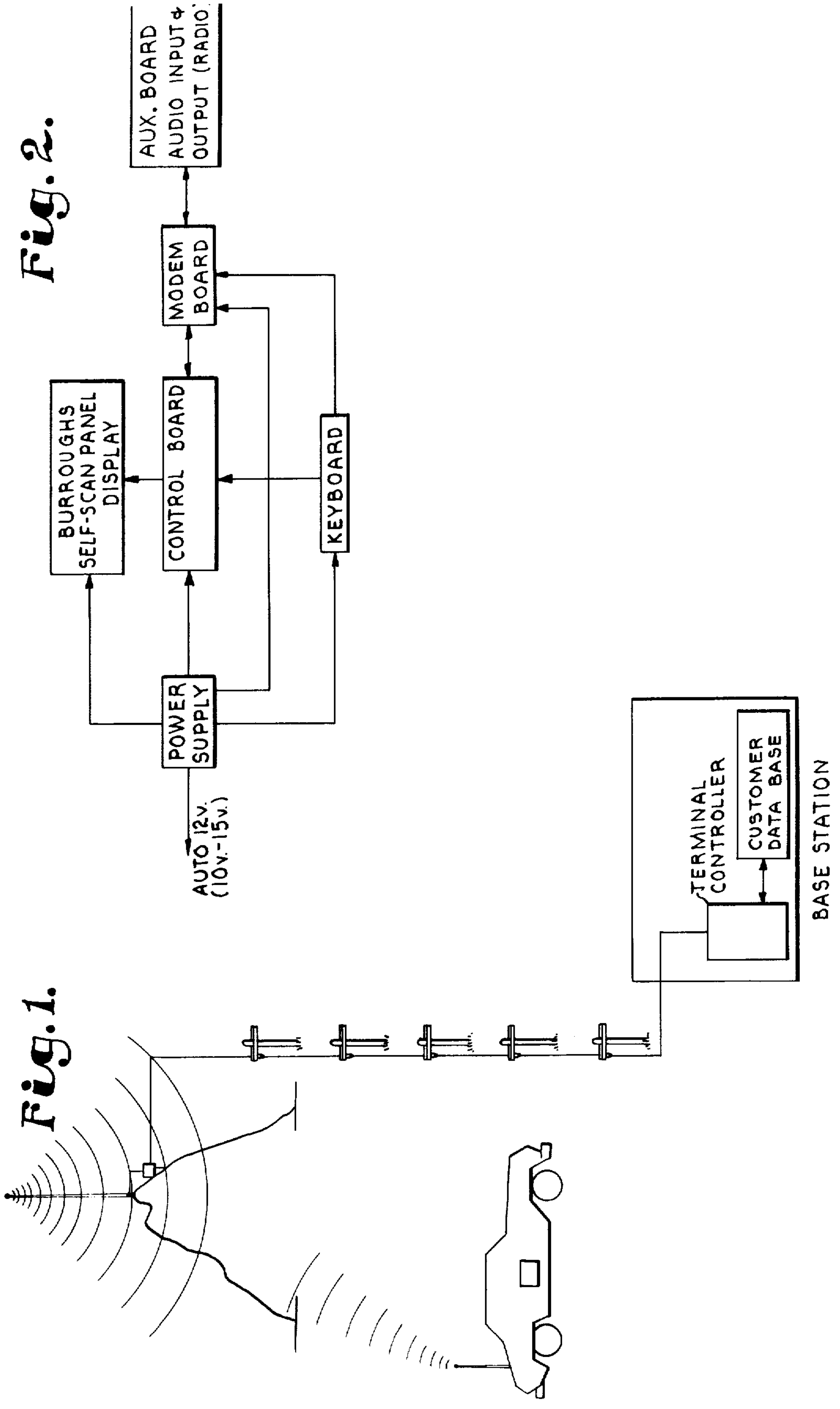
FIG. 1 is a schematic representation of a typical mobile terminal system including the mobile terminal units, the radio base station, the terminal controller and the computer data base.
FIG. 2 is a block diagram of a typical terminal unit including the power supply, the keyboard, the modem, the control board and the SELF-SCAN panel display.
Figures 3, 12:
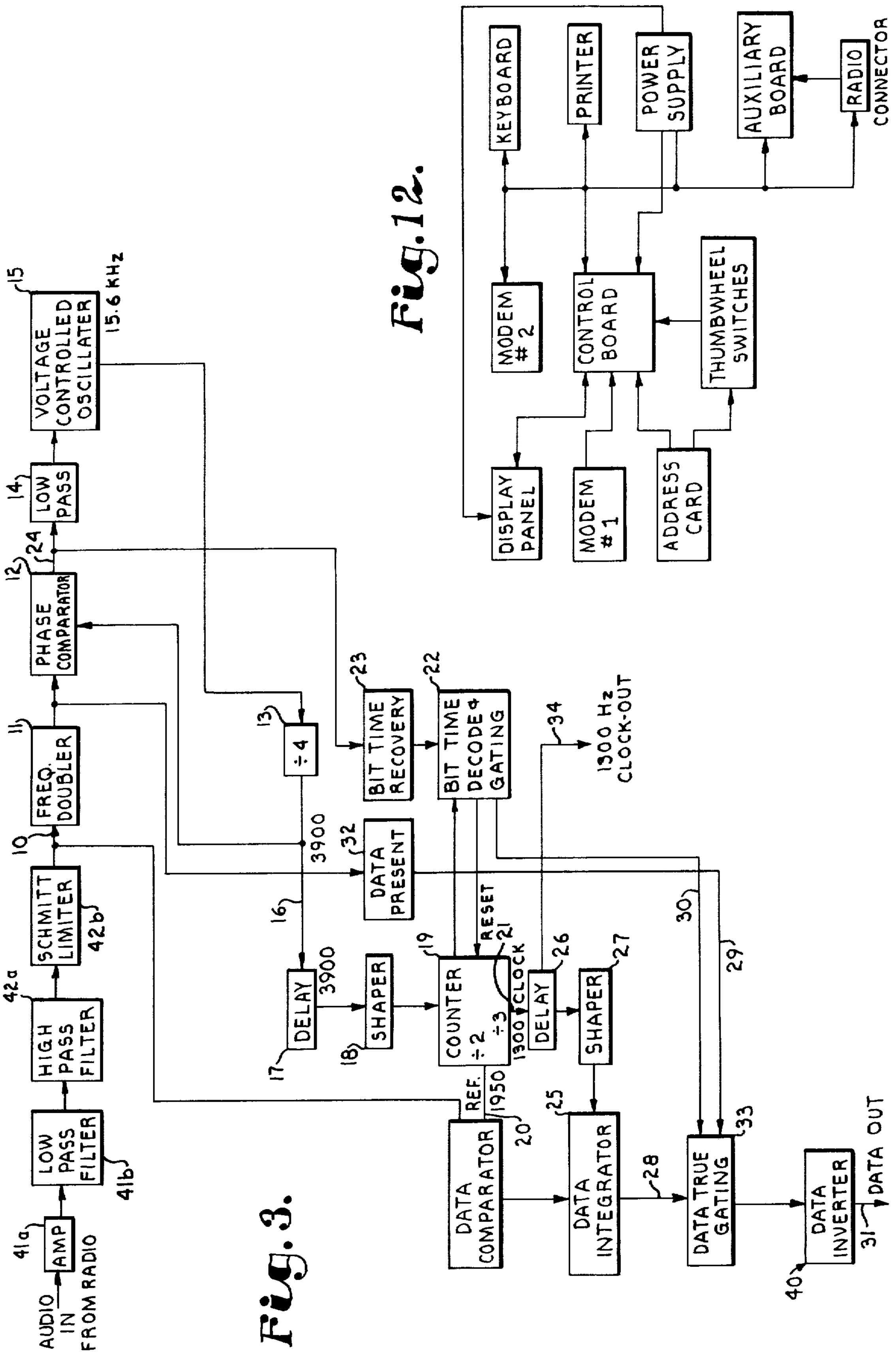
FIG. 3 is a block diagram of the demodulator portion of the modem located at both the terminal unit and with the radio base station or dispatcher's station.
Figures 11, 11A:
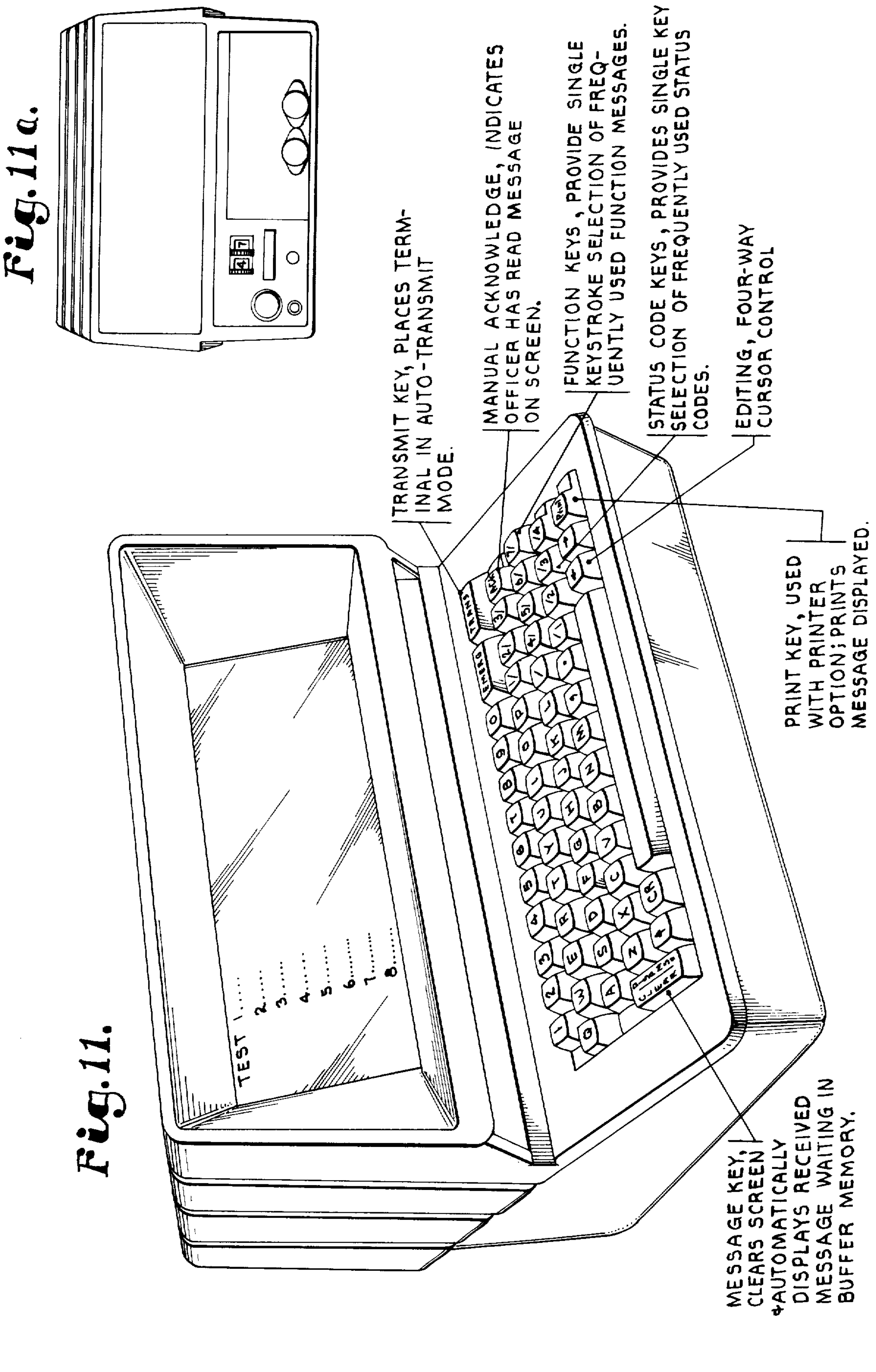
FIG. 11 is a perspective view of a typical terminal unit.
Figure 13:
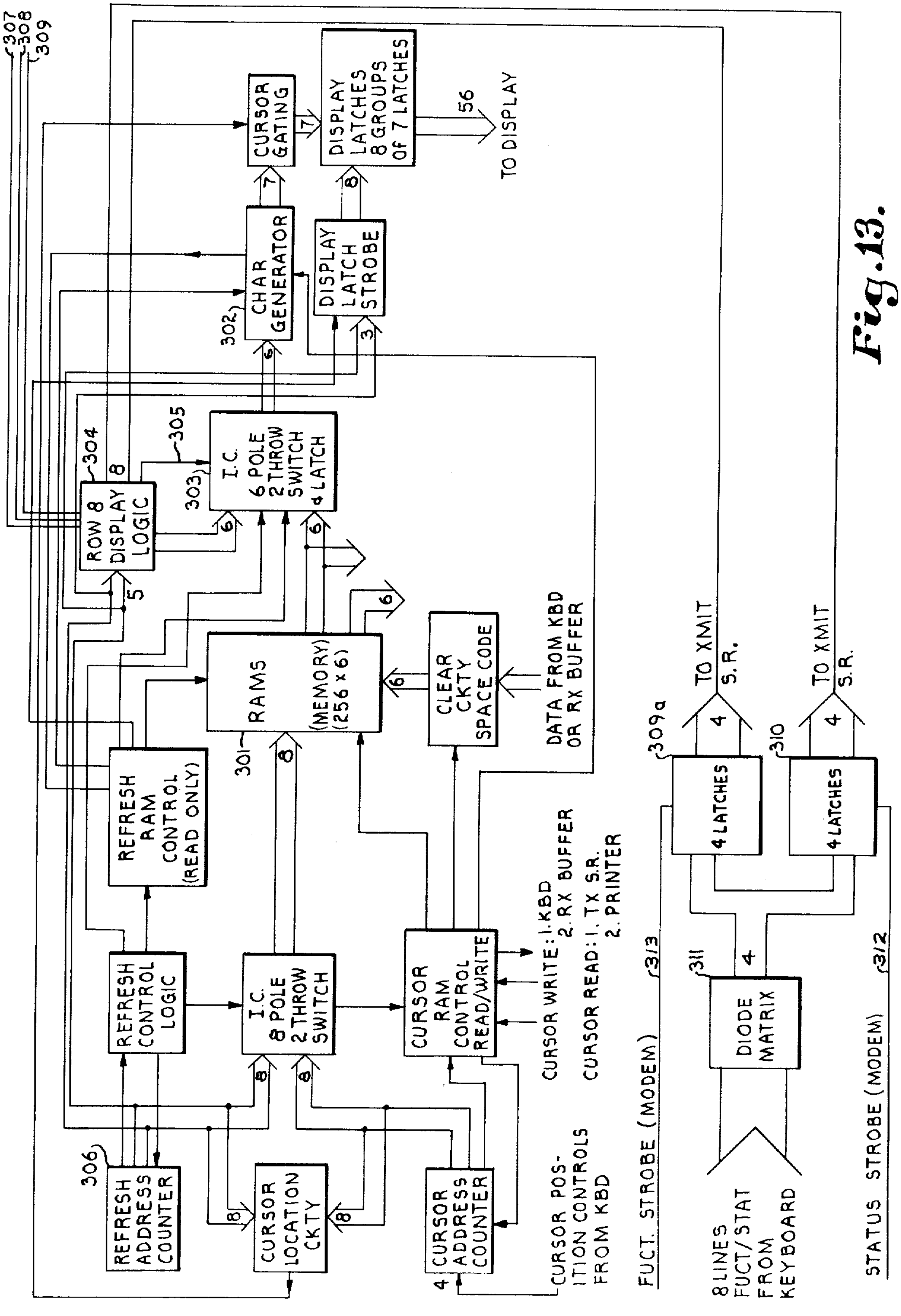

FIG. 11*a* is an elevational view of the back of a terminal unit showing the plug-in address cards and the thumbwheel switches;

FIG. 12 is an interconnect block diagram of the terminal unit similar to FIG. 2; and FIG. 13 is a block diagram of the display logic board with additional circuitry for controlling the mode line of the display panel.

The two-way mobile digital communications system is generally shown in FIG. 1 and will comprise equipment generally located in three different areas. The base station radio is normally located at some remote location having sufficient height relative to the surrounding topography so that the conventional two-way radio antenna mounted on a police car will provide for good transmission reception. An interconnection is provided between the base station radio and the dispatcher or police station via the conventional telephone line. As a practical matter, the police station or dispatcher may be anywhere from two blocks to a hundred miles away from the base radio station. The usual situation is that the police station or dispatcher has a data base or central processor either on site or at some remote location that is to be interconnected with the mobile terminal through the radio base station. For example, the conventional telephone installation, presently being used in prior art systems for voice communication, can also be used to send digital information between the data base (usually the large digital computer) and the mobile terminals in the police cars.

As a practical matter, a programmable terminal controller is an integral part of the system and interfaces between the existing data base (a large computer) and the remote terminal units. This terminal controller performs all of the system timing and the sytem buffering required to interface the different characteristics of the mobile terminal to the data base. As will be seen, the programmable terminal controller will include a serial modem that converts serial audio information into serial digital data which will be transmitted to a serial to parallel converter therein for the conversion of serial information into bit parallel characters. These characters are received by the CPU in the terminal controller, processed, decoded and buffered until the bit parallel characters are transferred to the customer's data base usually at the request of the data base. Normally, the data base controls all two-way communication between the programmable terminal controller (hereinafter identified by the terminal controller) and the data base. The normal configuration is such that the data base will poll the terminal controller at a very high rate to effectively ask the terminal controller if it has any information to be sent and, if the terminal controller does, the information will be sent. Otherwise, either there is no transmission or transmission of a character indicating that there is no request made or data to be sent.

In actual practice, the data rate between the terminal controller and the data base is very high relative to the communication rate via a two-way radio. Therefore, the possibility that the terminal controller would build up a backlog of messages is extremely remote since the data base can poll the terminal controller much faster than the messages can be received from mobile terminal units in the field. Further, the terminal controller not only controls the responses to the interrogations or polls from the data base but it also controls the communication in the radio system since it is effectively "brain" of the system. The terminal controller can also interrogate specific mobile terminal units and will buffer that information or print it out on a teletype (appropriately connected thereto) or send it to the data base to update status information. However, the primary function of the programmable terminal controller is to receive inquiries from the mobile terminal unit and buffer them for a short period of time before the next interrogation by the data base. On the return of an answer to an inquiry, the terminal controller buffers the answer from the data base until such time that it can send out a message to mobile unit that originated the inquiry. The terminal controller then waits for an acknowledgement concerning the reception of an answer to the inquiry.

From the above it may be seen that the subject system performs at least four basic functions as an information retrieval system permitting a police officer in the field who wants to check a license number of a vehicle or a gun serial number or any other personnel description for any type of criminal information related thereto from the police officer's automobile. With the subject system, the officer may simply key the information into the mobile unit and transmit same to the programmable terminal controller which in turn sends the information on request to the data base having the information therein and returns the answer to the originating mobile terminal unit. This is performed at a great savings in transmission time over the normal voice communications systems now being used.

Secondly, the system operates as a digital dispatcher whereas present systems generally require verbal or oral communication with the dispatchers from the individual automobiles and that the dispatching is performed using two-way radios to obtain an oral reply. With the later described mobile terminal units, the address of the location and the type of complaint can be typed on the dispatcher's console and sent directly from there to the terminal unit in the police car. Upon receipt of the message from the dispatcher, the officer in the car may push an appropriate acknowledge key on the terminal unit keyboard sending an acknowledgement back to the dispatcher indicating that the dispatch has been received.

A third function of the system is the possibility of effecting a rapid vehicle location. An officer could key in, at fixed intervals, his vehicle location and transmit same so that the data base computer can keep track of last location and also constantly update this information to the dispatcher.

A fourth important function of the system relates to the updating of the officer's status which now consumes a considerable portion of the transmission time by calling the dispatcher and informing him that the officer is coming on duty, going off duty, going to lunch or any of the numerous other status conditions that are normally incurred. This takes a considerable amount of time and can be significantly shortened by the terminal unit in that a proper status key on the terminal unit may be depressed, the transmit button activated and the information sent to the data base computer which in turn could be relayed to the dispatcher.

Turning now more particularly to the individual mobile terminal unit, it has been suggested above that the terminal unit will be mounted in the police officer's automobile and will connect with the control head of the police radio. For convenience of illustration, the connection with the control head will include at least four conductors. One conductor will be allocated to the audio input, another to the audio output, a third to a transmitter turn on signal and finally a fourth conductor allocated as a ground wire. The terminal additionally interconnects with the car battery between the 12 volt positive and ground terminal thereof.

The mobile terminal unit itself is generally comprised of five modules which include a hooded screen for displaying the alpha numeric characters that are to be sent or received and the keyboard which is used to enter the characters that are displayed on the screen. The other three modules which generally comprise the mobile terminal unit to include: (3) the control; (4) the modem board; and (5) the power supply (see FIGS. 2 and 11).

As suggested, the keyboard module is used to enter information on the screen and to edit the information thereon. It is also used to enter function/status information and to control the transmission of messages. For instance, the keyboard will include a transmit key and will further operate to bring in received messages from the buffer memory. Also, the display screen may be cleared by the utilization of an appropriate keyboard key. Actually, total unit control, with the exception of power on and off, is accomplished from the keyboard.

The control board is a 12 layer circuit board with a plurality of integrated circuits located thereon. This board actually contains the decision making intelligence for the terminal unit.

The modem board performs all the keyboard encoding of all functions and status keys and all curser and control keys. Generally, the information is entered from the keyboard into the memory on the control board with the control board operating to send the information to the display in correct format to form characters. Information to be transmitted is in the memory on the control board in the integrated circuitry. When the transmit key is depressed on the keyboard, the unit sends the information from the integrated circuit memory on the control board to the modem board which changes the digital signal to an audio signal and is sent to the base station radio. The modem board keys up the transmitter of the unit and also provides audio information to the radio which is modulated and sent (by two-way radio) to the base station radio which in turn reverses the process and decodes the information back to audio information. This audio information is changed by the demodulator in the terminal controller back to the same digital form it had in the terminal unit. The demodulator then sends that information to the terminal controller processor which, under program control, stores and delivers same to the data base computer upon request. When the response from the data base computer to that inquiry is returned to the terminal controller, it agains reverses the process, changes into audio information which is sent to the terminal unit and thereupon is decoded.

The system also includes a message format (FIG. 7) that allows for great flexibility of the included elements. Both control functions and information can be sent simultaneously and both can be modified quite easily within the message structure. Actually, the message structure will contain two start-of-message characters followed by two address characters, one control character, one status character and any variable message that can vary from zero characters to 224 characters. Finally, the message structure will be terminated by an end-of-message character. The control status characters allow for the flexibility in the control function of the transmission. For example, a message could be sent and the data base computer would like to command the terminal to not only display the message but at the same time to sound an alarm (such as an automobile horn). This can be done by setting a bit in the control field or, if the terminal has a printer attached, the computer can command the terminal to automatically print the message when received or not print the message when received whichever it desires.

The control field is also used to instruct the terminal (or the computer) as to what type of message it is receiving. For example, the terminal might be receiving a message from the computer. Alternately it may be receiving an interrogate from the computer or it may be receiving an acknowledgement or a message that is sent from the data base computer. An interrogate will simply indicate that the data base computer wants to know what is the present status condition of the unit. This is automatically sent to the terminal upon an interrogate command. The interrogate command allows the "contention system" (which presently consists of a message followed by an acknowledge from the receiving party) to be converted to a polling system in which case the computer will poll each unit successively for information to be sent.

The present system is called a "contention system" because all mobile terminals are contending for the channel. The terminals wait until the channel is free and then transmits randomly. Accordingly, the cost in interference between multiple units has been eliminated on the same channel.

Turning now more particularly to FIG. 2, the SELF-SCAN panel mentioned above manufactured by Burroughs Corporation is utilized as the character displaying portion. (Note the cited Application Notes for any detailed description of the display). The SELF-SCAN panel is a plasma or neon gas display which is ionized at the proper cross-section of annodes and cathodes to form alphanumeric characters on command of the circuit located on the control board. Further the SELF-SCAN panel is refreshed or scanned rapidly as dictated by the logic display circuitry also located on the control board. Refresh is performed 80 times per second so that the flicker is not noticeable by the human eye.

The keyboard for the terminal unit is a reed switch keyboard appropriately wired to obtain the alphanumeric capability and the function status previously mentioned. The encoding is accomplished by integrated circuitry, part of which is a printed circuit board located below the keyboard with another part located on the modem board. The keyboard actually has three interrelated areas. For example, as seen in the Figure, the alphanumeric portion of the keyboard will include lettered keys along with numeric and punctuation keys arranged in typical typewriter keyboard order. These keys are all encoded by the integrated circuit mentioned above with the output of same being sent to the modem board, which in turn sends the encoded output to the control board. The control board then utilizes the alphanumeric code generated by this encoder circuit and stores same in the memory thereof allowing the characters (or character) to be appropriately displayed on the Burroughs SELF-SCAN panel screen portion.

The other two portions of the keyboard are the cursor control keys and the function/status keys. The cursor control keys are the keys that allow editing of the alphanumeric information and the clearing of the SELF-SCAN panel or the transmitting of infomration to the data base computer. Encoding for these particular keys is performed on the modem board which generates a different pulse for each individual key and sends that pulse to the control board to change the location of the cursor on the SELF-SCAN panel. The cursor has the visual appearance of a half tone square that moves on the SELF-SCAN panel indicating the next position which the operator will up-date when he depresses the next alphanumeric key on the keyboard. The function/status keys are used for "canned" messages and for up-dating the officers status for the dispatcher's information. In actual practice, an officer may depress a function key and then the transmit key to transmit a prearranged message to be decoded by the terminal controller and sent to the data base computer thereby significantly shortening the normal inputting requirements of the officer operating the mobile unit.

As suggested above, the terminal is provided with a multi-layer printed circuit board or control board which operates to display messages for the operator officer as he keys them in on the keyboard. Further, the board allows the operator to tranmit the message from the display to the data base computer and to display and receive the return information in order to evaluate the response. This board (control board) may be considered as having two distinct areas. The first portion of the board to be considered is the display circuitry which provides the SELF-SCAN panel with digital information necessary to permit the writing of characters correctly on the display surface and to be able to change the characters (edit the characters) and to erase the same. The other portion of the control board is the control circuitry which "controls" the operation of the unit through the operator having access to the keyboard. Display circuitry receives a six bit ASCII code that is routed through the modem board after originating in the keyboard. The ASCII code is determined by which ones of alphanumeric keys are depressed by the operator officer. When the key is depressed, the ASCII code appears on the output of the keyboard integrated circuit. A strobe signal accompanies the code with the presence of the strobe indicating to the display circuitry that a new character is to be entered into the display memory. Actually, the dispaly memory is a MOS integrated circuit capable of storing 256 alphanumeric characters (note the Burroughs Application Notes, supra). Each alphanumeric character is identified by the six bit ASCII code which is updated each time the officer depresses a key on the keyboard. Location of where the character is entered on the screen is determined by the position of the cursor on the screen with the position of same being changeable by using the cursor control keys.

When a clear key is depressed, the screen is cleared of all information, the cursor goes to the home position which is the upper left-hand character position on the screen. The clear key on the lower left-hand portion of the keyboard clears the entire unit and anything in the display memory is destroyed cleared. The whole terminal is reset and ready to be reused.

The ASCII codes for the 256 characters are stored in the random access memory mentioned above and the information is transferred to the SELF-SCAN panel at the appropriate time as determined by timing signals on the control board. Clocks and counters all run in synchronism with the scanning of the display so that characters are taken out of the memory and displayed on the screen at the proper instant to put them in the correct position on the screen. All the timing in the display circuitry is designed to the specifications of the SELF-SCAN panel in order to properly drive same.

One of the unique features of the display pertains to the use of the bottom or lowermost line on the SELF-SCAN panel. This line is referred to as the "mode line" and eliminates the need for indicator lights elsewhere on the terminal. The mode line forms the operational status of the terminal at any instant. For example, if the only characters seen on the bottom line (mode line) are F/S followed by two numbers, it is an indication that the terminal is idle and no messages are being sent or have been received so that the unit may be turned off without interfering with any operation.

Upon entering a message from the keyboard onto the display, an officer may check the correctness of the entry and if it is correct, the transmit key is then depressed allowing the message to be sent. When the transmit key is depressed, a work "TRANSMIT" appears in the middle of the bottom line. This is a visual indication that the terminal is in the transmit mode attempting to send a message to the programmable terminal controller and the data based computer. As soon as the computer receives the message correctly with no errors, it will return and acknowledge. Upon receipt of the acknowledge by the terminal, the "TRANSMIT" word will be extinguished. Therefore, the officer operating the mobile terminal unit has an indication that the message has been received by the terminal controller and he can wait for the proper response. If the "TRANSIT" word remains on the panel for a considerable length of time, this is an indication that the terminal is trying to get the message through. If the terminal transmits five successive times and does not get an acknowledge to any of the five, then a "RETRANSMIT" word will appear to the right of the "TRANSMIT" word and the "TRANSMIT" word will no longer be visibly apparent. The "RETRANSMIT" appearance on the panel instructs the officer that the unit has made at least five unsuccessful attempts to send the message through the data based computer and the decision as to whether or not to send it again is left to the officer.

Upon receipt of a message by the terminal, it is automatically stored in memory and the word "MESSAGE" will appear in the lower left hand portion of the mode line in the display. This indicates to the officer that a message has been received and if he would like to see the message then the clear/display messaage key should be depressed. As the name implies, the clear/display message key will operate to clear what is on the display and, once cleared, allows the message that is in the buffer memory to appear immediately on the screen. If the message comes in to the buffer memory, the "MESSAGE" word appears on the mode line so that the screen cannot be cleared with the clear/display message key without automatically displaying the message. If it is desired to clear the panel but not to visually display the message, the only alternative is to type over all of the characters on the panel with a space bar character thereby blending the message characters out. This feature of the terminal using the bottom line or display as an indicator line permits the remainder of the terminal to be freed for other operation and eliminates the use of incandescent lights or light emitting diodes indicator lights to indicate these functions.

The control circuitry works in conjunction with the display circuitry but is independent thereof. The control circuitry receives all messages, buffers all messages, checks for errors on all messages, checks addresses and checks control characters. For example, the control circuitry looks at the two start-of-message characters followed by two address characters which, if decoded properly so that the terminal is being addressed, then the control characters are examined. If the control character is an acknowledge, the terminal will turn off the "TRANSMIT" word and be released from the transmit mode. If the control character indicates "MESSAGE", then the terminal will begin shifting the incoming message into the buffer memory. If the control character is an interrogate that is being received, then the terminal will get ready to respond to the interrogate. If the control character is an auxilliary function such as print, then the terminal will prepare to print the message and text information. The alphanumeric information follows the control character. Therefore, in the situation having a message following, the buffer memory starts loading this information following the control character.

Because of the contention mode where many mobile terminals may be using the same radio channel in contention with one another, there is a possibility that several units might try to transmit the first time in the same instant (i.e.: two officers and two different cars depressing the transmit button to send a message at the same time). The simultaneous transmission could possibly interfere with each other and neither message would get through. If each terminal waited the same length of time to send again then they would interfere a second, a third, a fourth, and fifth time and the message would never get through. Therefore the terminal unit is designed to transmit at random intervals. The minimum and maxium time intervals between retransmissions may be set. The terminal units normally are adjusted for a 2 second minimum and 8 second maximum time interval between adjacent transmissions.

To review somewhat, the display memory operates to refresh and continues to "write" eighty times a second the information on the display. The information that is received first of all goes into the buffer memory and is stored there. The "MESSAGE" illumination will appear on the display to indicate that the buffer is full. The officer may then depress clear/display message button transferring the information from the buffer memory into the random access display memory. The "message" flashes onto screen panel display and extinguishes the "MESSAGE" word on the lower left hand portion of the screen panel display. Now the message may be evaluated by the officer.

If the officer wishes to enter a message he can enter the alphanumeric information on the screen panel which puts same in the random access memory thereby storing the data for transmitting. The transmit cycle is initiated by the officer depressing the transmit key which first moves the cursor bazck to the home position and then dumps the first character from the display memory into the modem. This sends the character by changing it into an audio signal. The cursor jumps to the second position which sends the code for that character to the modem (changing it to audio) and the cursor scans the top line, jumping to the second line and finally scanning the entire length of the message. In other words, the cursor will scan one character or as many lines as the message comprises. Accordingly, the length of the transmission or that amount of time that the modem is sending is directly proportional to the characters on the screen thusly conserving air time.

When transmission occurs, all characters are placed at the beginning and into the text automatically. No special keys have to be depressed to terminate the message on the screen prior to transmission. Accordingly, efficiency of transmission is substantially increased with the text information being extracted upon transmission from the random access memory. The control status characters are in storage in the display circuitry and are extracted and transmitted prior to the text information with the control information being determined by the type of transmission presently being sent.

The control information is determined by what type of transmission is occurring. In other words, the type of transmission determines the control characters or which control bits are transmitted. If the transmission is initiated by the officer, then a bit is set in the control character which tells the computer that this is a text message being sent from the terminal. If the transmission is an acknowledge to a received transmission from the computer, then a bit is set in the control character that informs the computer that an acknowledge condition is being transmitted. Likewise, if the transmission is an answer to an interrogate and the buffer is full, then a buffer full bit sent by the terminal as a control character instructs the computer that the terminal unit's buffer is full and if the message is correctly received, a negative acknowledge (NAK) is returned which indicates that the message was correctly received but it could not be stored due to a full buffer memory. This sets both the ack and buffer full bits. If the transmission is a manual acknowledge then the control character will have a bit set in it to indicate manual acknowledge and that it is different from the "hardware" acknowledge.

There are four possibilities for control bits and control words for outgoing messages. The first is a control bit indicating that the outgoing transmission is a message to the computer. The second possibility is for a control bit to indicate that the outgoing transmission is an acknowledgement of the transmission from the computer. The third possibility is a bit that will indicate that the transmission is a manual acknowledge of a message or a dispatch from the dispatcher. Finally, the fourth possibility is a control bit indicating a full buffer in the terminal unit's buffer memory but a correct transmission.

The above mentioned possibility could be sent at any time a terminal unit is interrogated or any time a message is transmitted. Therefore, if the computer sends the terminal unit a message, the message word would be illuminated on the panel display, the buffer memory would be full and the computer may now send another message to the terminal unit. But, since the buffer in the terminal is already full, the message will not be received by the terminal but "NAK" will be returned, The computer will wait a programmable length of time and retransmit the message.

In the message format, the control character is followed by a status character with the status character containing function/status information that is entered by the officer on the right hand portion of the keyboard. There are function/status keys, as previously mentioned, operating so that a "canned" or fixed message may be automatically transmitted without requiring the message to be typed over and over again. It is contemplated that there will be seven function keys and that they may have any preselected meaning so long as it is consistent throughout the system. It is not necessary that the function keys be utilized but are available for further use and their meaning is under a program control in the terminal controller.

The status keys in the lower right hand portion of the keyboard (four keys numbered 1, 2, 3 and 4) have a meaning which is also programmable. Both the function and the status keys have a number corresponding to each individual key. The function keys correspond to the ones having numbers above a slash with the status keys corresponding to those with numbers below the slash. The digital information corresponding thereto is on the lower right hand portion of the panel display (on the right hand side of the mode line) and as such alphanumeric characters F/S followed by numbers which appear thereon. The first number corresponds to the function and the second number corresponds to status. Therefore if a function 1 and status 2 is depressed, the lower right hand portion of the screen would read F/S 12 and the information on that mode line (function status) is transmitted after the control character in the status area of the message preceding the text. Eight bits (two 4 bit characters) of information are sent for those two characters. The control status characters are not the same length of characters as the rest of the message however, the entire message is comprised of seven bit characters.

The control status characters comprise a total of 14 bits which are two 7 bit characters with the control characters comprised of four bits of the first character. The status characters comprise the last two bits of the first character and the six bits of the second character. Therefore, four of the 12 available information bits are used for control and the eight remaining bits are used for status. The other two bits (making up the 14 total) are the two parity bits of the two 7 bit characters. These characters are transmitted just prior to the text with the text information immediately following the parity bit on the last status character.

As suggested, the text may vary from 0 to 224 characters followed by an "end of message" (EOM) character. The end of message character is unique from any alphanumeric character available on the keyboard therefore eliminating the possibility that nay alphanumeric character can be confused with same.

The random access memory which stores the information that is on the display is the data source for the outgoing message and stores via six bit ASCII code but does not contain parity. When the officer presses the transmit key the transmission cycle begins. The start of message characters go out followed by the address characters identifying the terminal. Then, the control status characters, alphanumeric characters and end of message characters are transmitted. The alphanumeric control circuitry adds a parity bit to all of the six bit characters providing error checking at the receiving end.

The parity is odd parity in that each character should always have an odd number of ones and the parity bit is changed accordingly so that the number of ones in each character is always odd.

When the transmit key is depressed the start of message character does not go out immediately. In fact, the start of message character will not go out until after a time delay which is conveniently referred to as "preamble". The preamble is required for the modem to obtain synchronization with the modem at the receiving end or at the base station. Therefore, when the transmit key is depressed, the cursor will appear in the upper left hand corner of the screen (or home position) wait for the duration of the preamble, start scanning and stop at the end of message, wait for the time-out (which is random) and transmit again. This occurs when the cursor jumps up to home position, hesitates and starts to rescan. The hesitation at the end of message is random and will vary within a minimum and a maximum limit that can be adjusted. The total number of transmissions before the terminal unit will jump into the retransmit mode can be varied simply by making a minor modification of the control board. Preamble length can be varied by changing the capacitor with a large range. The minimum and maximum delays between the transmission can both be varied with considerable ranges.

MODULATION TECHNIQUE AND MODEM BOARD

As suggested above, the terminal unit and associated system utilizes a modulation technique including a unique modem for communicating the coded audio tone between the terminal unit and the radio base station receiver. The communication technique is an improvement on the technique and system disclosed in the Advanced Development Laboratory Report 634-65-002 entitled "CPSK Data Modem Research" by Martin C. Poppe, Jr., a publication of Electronic Communications, Inc. of St. Petersburg, Florida.

The standard two way radio used for communication between the terminal unit and the base station transmitter receiver uses an audio bandwidth normally in the range from 0 to 3,000 Hz which contains a majority of the human voice frequency components. Therefore, to be compatible with two-way radios, the subject modulation technique should not extend beyond this bandwidth or information would be lost. In the subject system, a carrier frequency of approximately 1950 Hz is used but this value can be varied depending upon the speed and the bandwidth that is required.

It is significant to note that there are two pieces of information being sent simultaneously with the subject modulation technique. First, the data (1s and 0s) understood by the computer to relate to specific alphanumeric characters is sent. Simultaneously therewith, a clock signal is transmitted in order to indicate to the computer when to look for a change in the data (either to a 0 state or to a 1 state). As will be seen, it is necessary to know when a change is coming (or when it should occur) in order to determine whether the data is a 1 or a 0. Also the clock allows the receiver to rederive the absolute reference so that the 1s and 0s may be transmitted synchronously and such that simple parity may be used for checking.

The modulation technique is basically one of phase modulation. There exists one phase referred to as reference phase and the other as $\overline{\text{reference}}$ (which is the inverted reference). In order to get from the $\overline{\text{reference}}$ to $\overline{\text{reference}}$ it is necessary to go through an inverter and to go from the reference another inverter circuit is likewise used. In the subject technique, a logic 1 is defined as the signal that is the same as the reference while the logic 0 is defined as the $\overline{\text{reference}}$.

Data is designed to enter the modulator circuit at a rate equal to the bit rate or 1300 bits per second. This corresponds to 1300 pieces of data per second with each piece of data either 1 or 0. Accordingly, it is desirable to modulate the 1950 Hz carrier with the serial data being received at 1300 bits per second so that the same data may be rederived at the other end of the communications system by the computer.

This is accomplished in part by breaking the carrier up into periods. Since the carrier is 1950 Hz and the bit rate is 1300 Hz there is a 3 to 2 ratio (1950/1300). This indicates that there is one and a half periods of carrier in each bit interval. Accordingly, if the system desires to send six bits of information, nine carrier cycles of time would be required.

Figure 5:
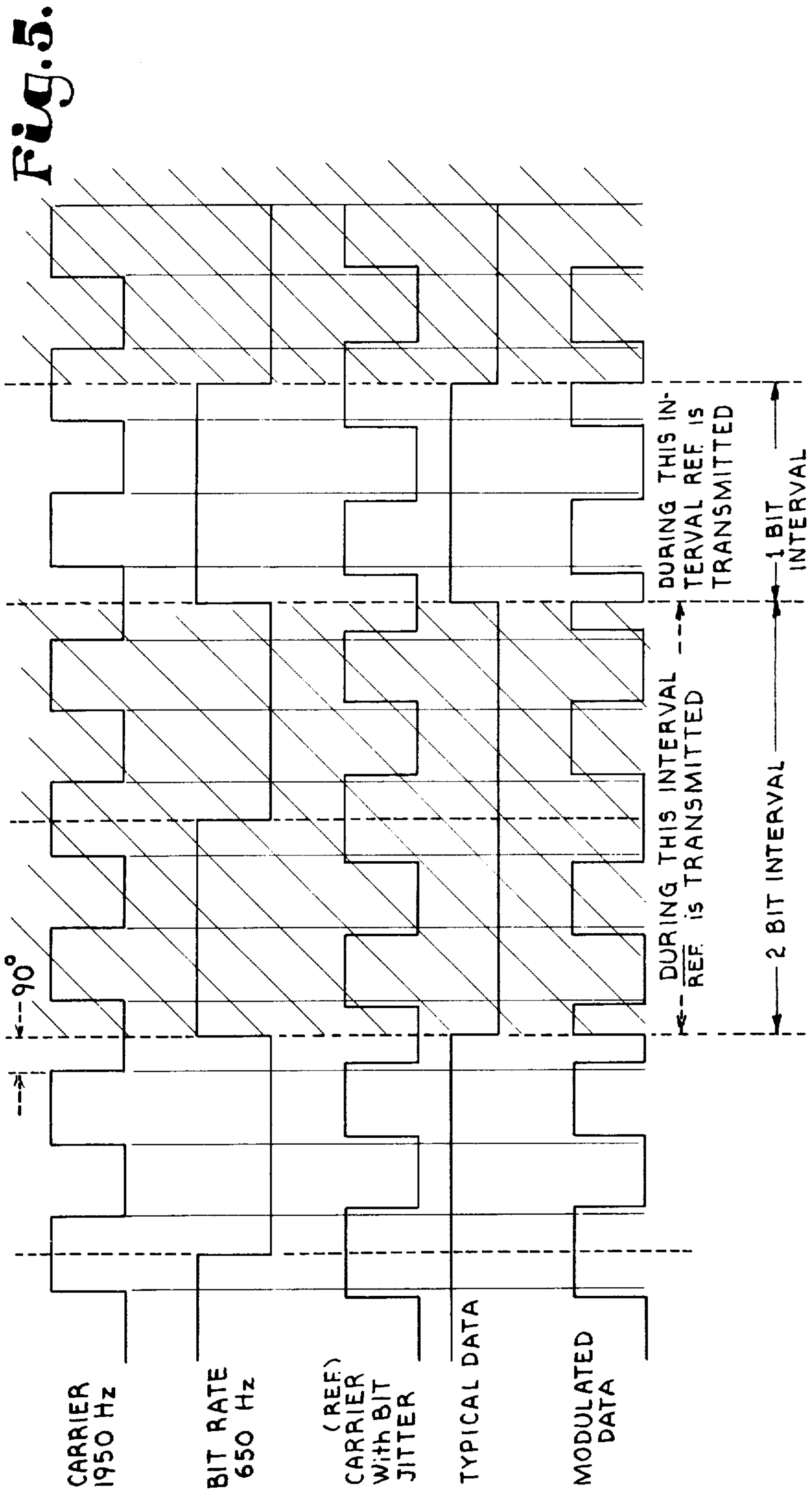
FIG. 5 is a modulation timing diagram showing a plot of the 1950 Hz carrier, the 650 bit rate, the reference carrier with bit jitter, typical date, and modulated data.
Figure 6:
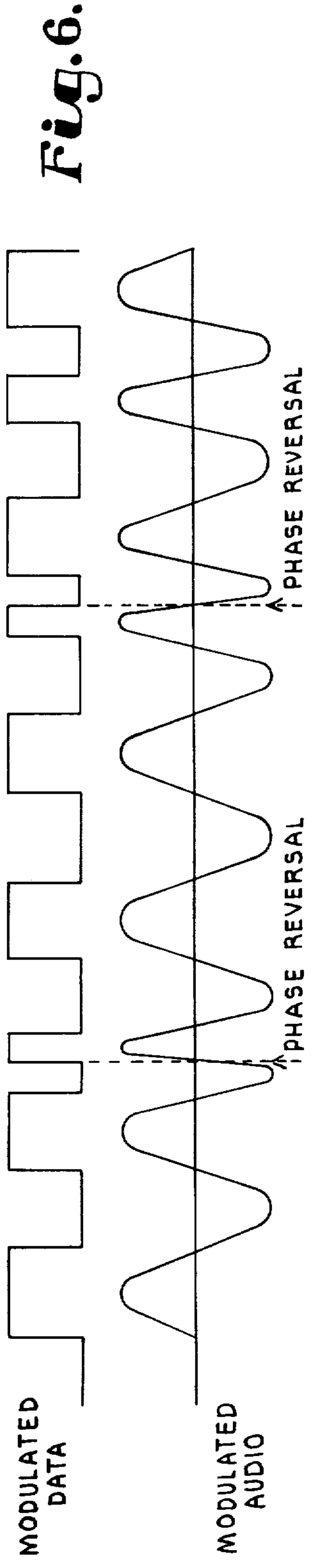
FIG. 6 is a plot of typical modulated data on audio including the modulated data and the modulated audio signals.

Turning now more particularly to FIGS. 5 and 6, the starting point on the carrier is indicated as the beginning of a bit interval. The bit interval points are defined as the intervals between the broken vertical line on the bit rate square wave. As seen on the FIG. 5, the bit rate signal is low for corresponding one and one half carrier periods and high for one and one half carrier periods.

A significant deviation in the modulation scheme as compared with that disclosed in the Martin Poppe, Jr. article, supra, is the timing relationship that may exist between bit rate and the carrier. The Poppe article makes no distinction as to where the bit rate signal should change from a low to a high or a high to a low relative to the carrier. It has been found that for optimum demodulation at the receiving end, the signals should relate to each other as indicated in the FIG. 5 plots in that the bit rate should either go from a low to a high or from a high to a low following the transition in the character. With the above arrangement, the worst alignment possible would result when a bit time transition should coincide with the carrier transition.

The upper plot in FIG. 5 represents the reference carrier, same being a symmetrical square wave with each positive pulse the same width as the negative pulse. The bit rate corresponds to the information that is to be transmitted along with the data and therefore will require that the transitions of the carrier relative to the state of the bit rate signal are advanced or retarded. For example, any time the bit rate is a logic 0 (low state) the carrier transitions are advanced 5 degrees. Further, any time the bit rate signal is a logic 1 (high state) the carrier transitions are retarded 5 degrees so that by examining the plot identified as "reference carrier with bit jitter", it is indicated therein that every three transitions on the particular plot either move forward or back from the previous three positions with the phenomena referred to as jitter. In this manner, the bit rate information is superimposed on the carrier.

At the receiving end, the jitter assists in rederiving the bit rate and as such corresponds to the clock transmitted with the data.

The fourth plot in FIG. 5 is referred to as a "typical data" pattern and is used for exemplary purposes. For example, a more simple case would be the transmission of all logic 1s which would essentially mean the data signal was identical to the reference carrier as the reference signal is defined as a logic 1. If all 0s were to be transmitted, then the data signal would correspond to the inverse of the reference carrier. In the situation where a combination of logic 1s and logic 0s are to be transmitted, it is necessary to switch between the reference and the $\overline{\text{reference}}$. Again, looking at the "typical data" wave form as compared with the "reference carrier" wave form it can be seen in the plot referred to as "modulated data" how wave form is accordingly generated. Any time the data pattern is a 1, then the modulated data output is the same as the reference. For any interval of time that the data is a logic 0, the signal transmitted as modulated data is the inverse of the reference.

FIG. 6 illustrates a plot of modulated data and the corresponding audio signal. Since it is not at this time commercially practical to transmit square wave information as shown in FIG. 5, the actual transmission will more closely approximate the sine wave signal shown in FIG. 6 as the "modulated audio". The same information is present in the modulated audio signal as in the modulated data signal with the main difference between the two wave forms lying in the fact that the fast low to high and high to low transmissions are now being changed to gradual sinusoidal type changes. This type of signal results from the modulated data signal being filtered by a low pass filter.

As will be seen, the frequency spectrum of the modulated data signal extends above the 3000 Hz available in the two-way radio system. The requirement of the limited bandwidth dictates the utilization of a filter means (low pass filter) thereby eliminating the high frequency components above the 3000 Hz and causing the resulting signal to approximate the "modulated audio" signal shown in FIG. 6. It may further be seen therein that the phase reversal points result in narrow pulse widths at the boundaries thereof.

As seen by the "modulated data" plot in FIG. 5, the width of the pulse on either side of the phase reversal is more narrow than the regular pulse width. If the phase reversal point is slightly moved to the left or right, then one of the pulses on either side of the reversal point would become even more narrow while the other pulse would increase in width. It is conceivable that the phase reversal point could reach the next transition on the modulated data signal thereby substantially eliminating a detectable phase reversal point.

If phase reversal is lost because of the above described timing coordination between the carrier and bit rate signals then a transition is essentially lost. However, the more transmissions that occur, the easier the bit time or bit rate signal is to rederive at the demodulator. For example, if the phase reversal is moved over to the first transition of the carrier (to the left as shown in the carrier plot) this would approximate a 90° phase shift. In this condition, there would be only two transitions in a bit interval instead of three and the bit information or the bit jitter would occur only twice instead of three times per interval. This would result in less noise immunity and it would be more difficult to rederive at the modulator. Accordingly, it has been found that for optimum derivation at the receiving end, the maximum zero crossings of the phase reversed signal are obtained by separating the carrier and the bit rate signal by 90°.

Figure 4:
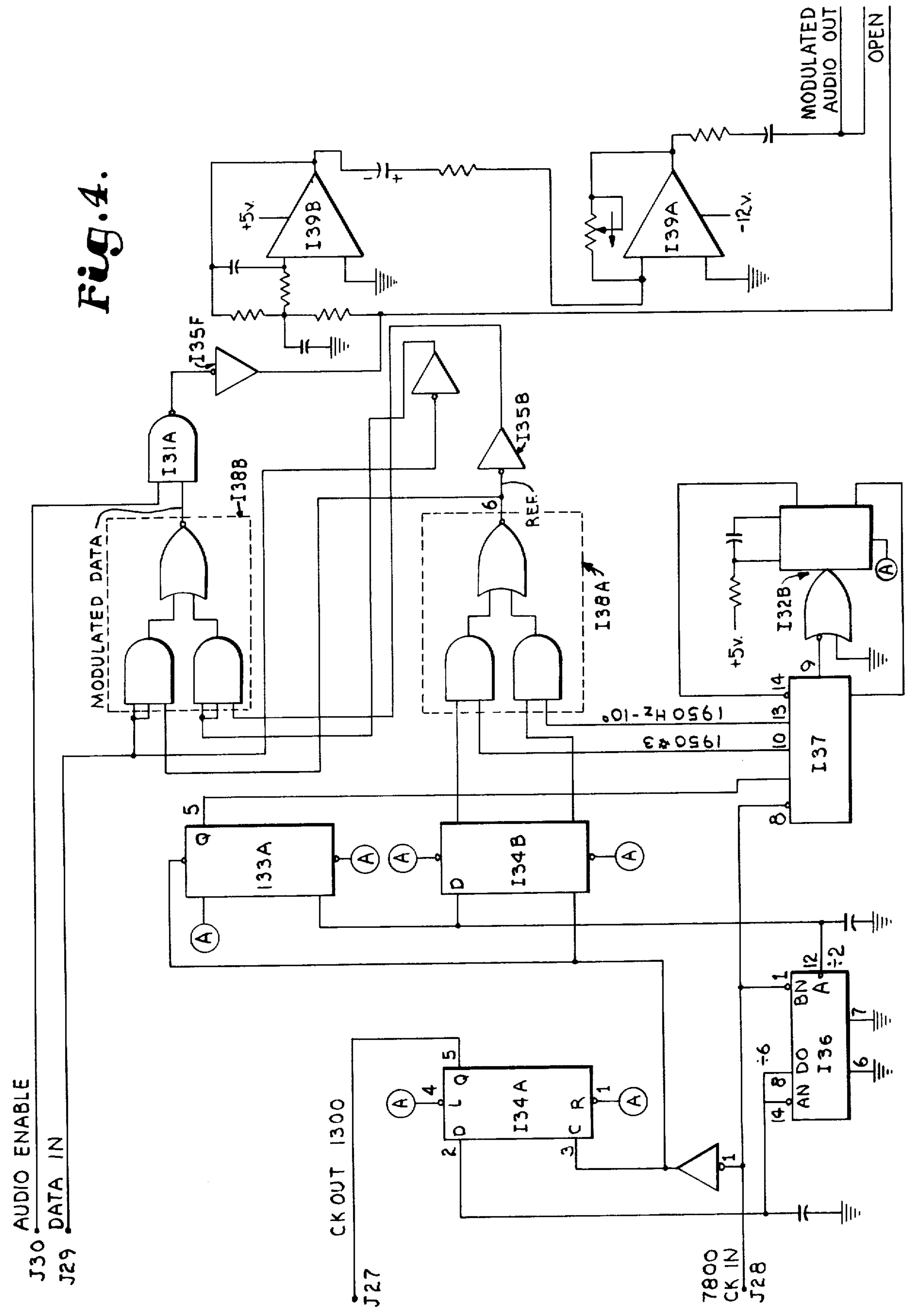
FIG. 4 is a circuit diagram of the modulator portion of the modem, said modulator cooperating with the demodulator of a remote unit to facilitate data transmission between terminal units, and/or the data base computer.

The signals discussed with respect to FIGS. 5 and 16 are produced by the circuitry shown in FIG. 4 and is physically located as a part of the modem. In actual practice, there will be a modem located in a mobile terminal unit and at the dispatcher location or at the site of the terminal controller. In any event, the subject modulator operates to receive digital binary information and converts same into an audio form that may be transmitted over any phone line or via two-way radio. The circuit also includes a necessary low pass filter which limits the transmitted audio to 3000 Hz, the allowable maximum by the FCC.

The basic signal input to the modulator shown in FIG. 4 is delivered to pin 28 and is the 7800 Hz clock input emanating from the control board, discussed later. In any event, the control board is continuously sending the 7800 Hz signal to the modem (modulator portion) with counter 137 receiving the clock input on pin 8 and dividing the frequency of same by four to produce a 1950 Hz signal output on pin 10 thereof. This 1950 Hz signal is one of the two that is used to generate the carrier with bit jitter as detailed with respect to FIG. 5.

Pin 9 on 137 is a divide by two output so that a 3900 Hz signal will be fed into the multivibrator circuit 132B which delays the signal by 15 microseconds (10° of the 1950 Hz signal). The delayed 3900 Hz signal is fed back into 137 via pin 14 and divided by two again therein to generate a symetrical 1950 Hz signal output on pin 13.

The two 1950 Hz signals are then delivered to the integrated circuit 138A which is an AND/OR invert gate. The other two signals to the AND/OR invert gate come from 134B and are similar signals except that there is an inversion in phase with respect to one another. These signals are actually 650 Hz bit rate signals generated by counter 136 which, having received the 7800 Hz clock input on pin 1, divides same by six on pin 8 and feeds back on pin 14, dividing by two on pin 12 thereby totally dividing the 7800 Hz signal and resulting in the 650 Hz actually applied to the D input of the flip flop 134B. As suggested, this flip flop (134B) translates the 650 Hz signal into two signals required for the AND/OR invert gate to generate the carrier with bit jitter wave form (see FIG. 5).

The output of the AND/OR invert gate (138A) on pin 6 and is indicated as the reference in the above discussion. This signal (reference) is applied through an inverter 135B to another AND/OR invert gate 138B. The additional input to AND/OR invert gate 138B is the data coming from the control board (on pin J29) and which must be modulated to an audio form. Initially, gate 138B operates to modulate the data into the modulated data wave form. This modulated data is gated on and off by gate 131A via signal generated on the modem board from the "push to talk" signal that is received from the control board and indicated as the incoming signal at pin J30, "audio enable". The output of gate 131A is inverted at 135F and fed to a low pass filter for removing the high frequency components and eventually generates the modulated audio wave form shown in FIG. 6. In any event, this filter includes the operational amplifiers 139B and 139A along with the various resistors and capacitors shown as associated therewith.

Data coming into the modulator board from the control board must have a 0 to 1 or a 1 to 0 transition at the correct time with reference to the clock signals and the modulator. Therefore, the modulator clock signal that goes out on J-27 (labelled clock out 1300) and goes to the control board instructing same when to deliver another data bit to modulated input pin J29.

The modulator described above has several counters counting down on the same 7800 Hz signal and it is necessary to synchronize the counters. This is accomplished by using the 650 Hz output of 136 on pin 12 to clock flip flop 133A. Pin 5, the Q output of 133A, is used to reset counter 137 so as to synchronize counter 137 to counter 136.

It is significant to note that the subject modulator permits the clocking information to be included with the data. In other words, two signals are transmitted simultaneously, the clock and the data. The first AND/OR invert gate 138A generates the clock signals that are transmitted and the second AND/OR invert gate 138B generates the data to be transmitted. The fact that both signals are transmitted simultaneously is of significant value to the system since the demodulator decodes this clock information to determine the following two things: (1) The demodulator may determine exactly where on the received wave form a bit will begin; and (2) it allows the demodulator to regenerate the exact reference signal that was used to generate the modulation. In other words, the demodulator recovers the absolute reference signal developed on pin 6 of AND/OR invert gate 138A.

CONTROL BOARD RECEIVER

As suggested above, the signal from the modulator portion of a modem is transmitted via conventional two-way radio and/or usual telephone lines until it eventually reaches the demodulator of a corresponding modem. The demodulator is shown in block diagram form in FIG. 3 and indicates thereon that the audio input is first delivered to amplifier 41*a*. The information, in audio form, has to be processed, amplified, squared, decoded and demodulated in the circuitry discussed hereinafter. In actual practice, the signal received is often a fairly low level signal therefore requiring utilization of amplifier 41*a*. Further, the received radio signal may contain both low frequency and high frequency noise that has been generated during the transmission through the radios which could degrade the reception of the signal. Accordingly, a low pass filter 41*b* and a high pass filter 42*a* are utilized in conjunction with the initial receiving amplifier 41*a*. The low pass filter is operable to filter out any signals above 3,000 Hz while the high pass filter operates to filter out any signals below 400 Hz.

The band width required for the modulated signal is equal to the carrier frequency plus and minus the data rate. As mentioned above with respect to FIG. 5, the carrier is centered at 1950 Hz with the bit rate approximately 1300 bits per second thereby occupying a band from 650 Hz to 3250 Hz. The upper limit actually does exceed the 3,000 Hz upper level but there is very little information contained in the upper portion of the band. In any event, once a signal has been amplified and filtered it is eventually fed to the Schmitt trigger 42*b* which squares the signal and will not permit noise to falsely trigger same. The output of the Schmitt trigger is a logic compatable signal that may be processed by the integrated circuits located within the later described demodulator circuitry. Actually, the signal on line 10 is in the same form as the "modulated data" wave form shown in FIG. 5.

The purpose of the demodulator is to rederive the typical data wave form and the bit rate waveform from the modulated data. The signal or the modulated data wave form appearing on line 10 is first transmitted to frequency doubler 11 which doubles the basic received 1950 Hz frequency to a frequency output therefrom of 3900 Hz. As will be seen, the doubled frequency or the 3900 Hz signal operates to maintain a constant carrier signal for the phase locked loop which will include a later described VCO. Further, the phase lock loop could not lock with stability to the 1950 Hz spectral component of the received signal because of the possible phase reversal patterns that could conceivably be received As a result, a stable lock would not occur and the doubling prior to the phase lock loop eliminates this particular problem. The nonlinearity of a doubler produces a 3900 Hz amplitude stable signal as compared to the incoming 1950 Hz carrier signal.

The output from frequency doubler 11 is fed into one side of phase comparitor 12. The other input to phase comparitor 12 is a 3900 signal that is derived from a divide by four circuit 13. The phase lock loop mentioned above comprises the phase comparitor 12, the divide by four circuit 13, the low pass filter 14 and the voltage control oscillator (VCO) 15.

Phase comparitor 12 has an output which indicates the error signal that is fed through low pass filter 14 and applied to VCO 15 which is running at 15.6 Khz (or four times 3900 Hz). The divide by four circuit rederives a 3900 Hz signal and, as such, is applied to the other input of phase comparitor 12 under a correct locked condition.

As suggested, the 3900 Hz signal being derived from divide by four circuit 13 is locked to the incoming signal from frequency doubler 11 however, the signals are locked together at a 90° phase separation. The signal from the frequency doubler has many spectral components besides the 3900 Hz however, the signal derived in divide by four circuit 13 is a pure 3900 Hz square wave and, when locked to the 3900 spectral component coming from doubler 11, the other spectral components in same do not effect it. The 3900 Hz signal derived from phase locked loop is used in further processing of the incoming data since it is exactly the same frequency as the incoming 3900 Hz but does not contain other spectral components nor the bit jitter present on the incoming signal.

The 3900 Hz signal on line 16 is delivered to delay circuit 17 which compensates for the delay in the phase locked loop. A sharp very narrow pulse is generated from each transition of the 3900 Hz signal in shaper circuit 18 and is fed into counter 19. The counter circuit 19 divides the 3900 Hz signal by two thereby creating a reference 1950 Hz signal which is used for comparing with the incoming data that emanates from Schmitt trigger circuit 42b.

Counter 19 also contains a divide by three circuit that operates on the 3900 Hz signal to rederive the 1300 Hz clock output. Accordingly, counter 19 is used to produce the 1950 Hz reference signal and the 1300 Hz clock signal, these signals being shown as outputting on lines 20 and 21 respectively. However, the signals on lines 20 and 21 are not necessarily synchronized in the fashion required to reproduce the timing relationship as mentioned with respect to FIG. 5 and require that the bit time decode and gating circuitry 22 reset the counter so as to properly synchronize the reference and the clock signal. The output of the phase comparitor, indicated by the numeral 24, is applied to the bit time recovery circuit 23 (a filtering system) with the output of same being applied to the bit time decode and gating circuitry 22 which operates with integrated circuits to determine if the bit time signal is stable. When a stable bit time signal is recovered, the stable bit time signal is applied to the reset input on counter 19 to thereby synchronize the reference 1300 Hz clock signal to the original timing phase. Once this has occurred, the 1300 Hz clock signal may now be used to pulse the data integrator 25 after the clock signal is delayed and shaped by the delay and shaper circuits 26 and 27 respectively. The data integrator 25 will now accept the output of the data comparitor and determine if the received data was a 1 or a 0 during any bit interval.

The incoming data on line 10 is also applied to the data comparitor with the reference signal appearing on line 20. If the two signals are of the same phase, then the data output will be a 0. If they are of a different phase, the output will be a 1. The data integrator 25 will indicate over the period of time of the bit interval as to whether or not the output of the data comparitor was a 1 or a 0. The output of the data integrator 25 (line 28) contains the original data that was applied to the modulator. Line 28 is gated with line 29 and line 30 to indicate that the data coming out on line 38 is "good data". As shown, the signal on line 29 is derived from the output of the data present circuit 32 which is used with the bit time decode and gating circuit 22 to indicate when digital information is being received by the demodulator. At this time and only then will the output of the data integrator 25 be utilized. The data true gating circuit 33 is used to gate out the signal on line 28 during all other times. Therefore, the data present circuit 32 and the bit time decode and gating circuit 33 is enabled so that all data coming out of data integrator 25 is fed therethrough.

The two outputs of the demodulator are the "data out" signal on line 31 and the "clock out" signal on line 34. The clock out signal is used to instruct the circuitry that receives the "data out" when data is coming.

In the preceding discussion it has been repeatedly mentioned that the control board has three main subsystems thereon which operate as the part of the mobile terminal unit. The control board, for example, will include a logic circuit that is capable of controlling the SELF-SCAN panel in accordance with the described theory of operation in the articles entitled "Application Notes" Bulletin No. S102B and No. S104A published by the Burroughs Corporation on Feb. 1, 1971 and November, 1971 respectively. The control board will also include a receiver and transmitter sequencing logic circuit which will be discussed as separate boards.

The receiver logic board is shown in block diagram form in FIG. 22 and depicts the serial data input and the serial clock from the modem board, supra, in the upper left hand corner of the figure. The serial data is in message format shown in FIG. 7 with the control receiver circuitry operating to decode various portions of the message format for validity and content and for eventual display on the SELF-SCAN panel. In any event, the serial data along with the serial clock are initially applied to the start of message (SOM) initialization circuits 110 and the bit counter state decoder 111. The SOM initialization circuit 110 will comprise gating circuits that operate to indicate when the incoming data is in a binary 0 state. This condition then is delivered to the bit counter and state decoder 111 via line 110*a* and operates to instruct the bit counter and state decoder circuit 111 of the logic 0 state of the incoming data. The circuit 111 will count incoming binary 1s referenced to the last 0 state to determine when 14 binary 1s are consecutively received and as such will define a start of message character shown in the message format in FIG. 7. The bit counter state decoder 111 will include a counter operable to count the consecutive binary 1s in the serial data input to indicate start of message synchronization to the circuitry 112 (the receive message format control and check and message detector). The input 111*a* to received message format control and check and message detector 112 provides the necessary synchronization information to control the decoding and gating of the rest of the received message.

Simultaneously with the data and clock being applied to the above mentioned circuits, the data and clock are also applied to two serial shift registers 113 and 114 which also act as serial to parallel converters. After SOM has been received the clocking for shift registers 113 and 114 is accomplished by the gating circuitry in the shift register clock control circuit 115, the data that is contained in the shift registers 113 and 114 is sampled after two characters (or 14 clock periods) have been received. This sampling is controlled by the received message format control 112.

At this time it should be pointed out that the shift registers 113 and 114 have parallel outputs applied to a "group call" detector circuit 116 and an "all call" detector circuit 117. If an all call is indicated by receiving the correct code (as described in FIG. 7) line 119 (the unit address line to the receive message format control 112) will go high indicating to the format control 112 that the message should be received by the terminal unit. Likewise, if the group call detector 116 decodes a group call code (indicated in FIG. 7 as the address select bits being all 0) this condition will enable the 12 bit unit address, 8 bit group address compare circuit 118 to determine whether or not the eight bits (Y1–Y8) in shift registers 113 and 114 are the same as the eight bits entered via the thumb wheel switches. (The thumb wheel switches are located on the back of each unit and are conventionally operated and manually set.) If the eight bits from the thumb wheel switches agree with the eight bits in serial to parallel converter shift register 114, then gate 120 is enabled to indicate a unit address signal on line 119 and further applied to the receive message format control 112.

It is possible that the address characters stored in shift registers 113 and 114 will not indicate either the group call or an all call situation. In this condition, the 12 bit unit address, 8 bit group address compare circuit 118, determines whether the shift registers (113 and 114) compare with the ten bits from the address card and the two strap bits on the control board to thereby enable line 119 for the purpose of indicating a unit address signal to the receive message format control circuit 112. Only ten of the 12 unit address bits are programmable on the removable address card as suggested above, with the other two bits being strapped with wire jumpers on the control board.

Figure 7:
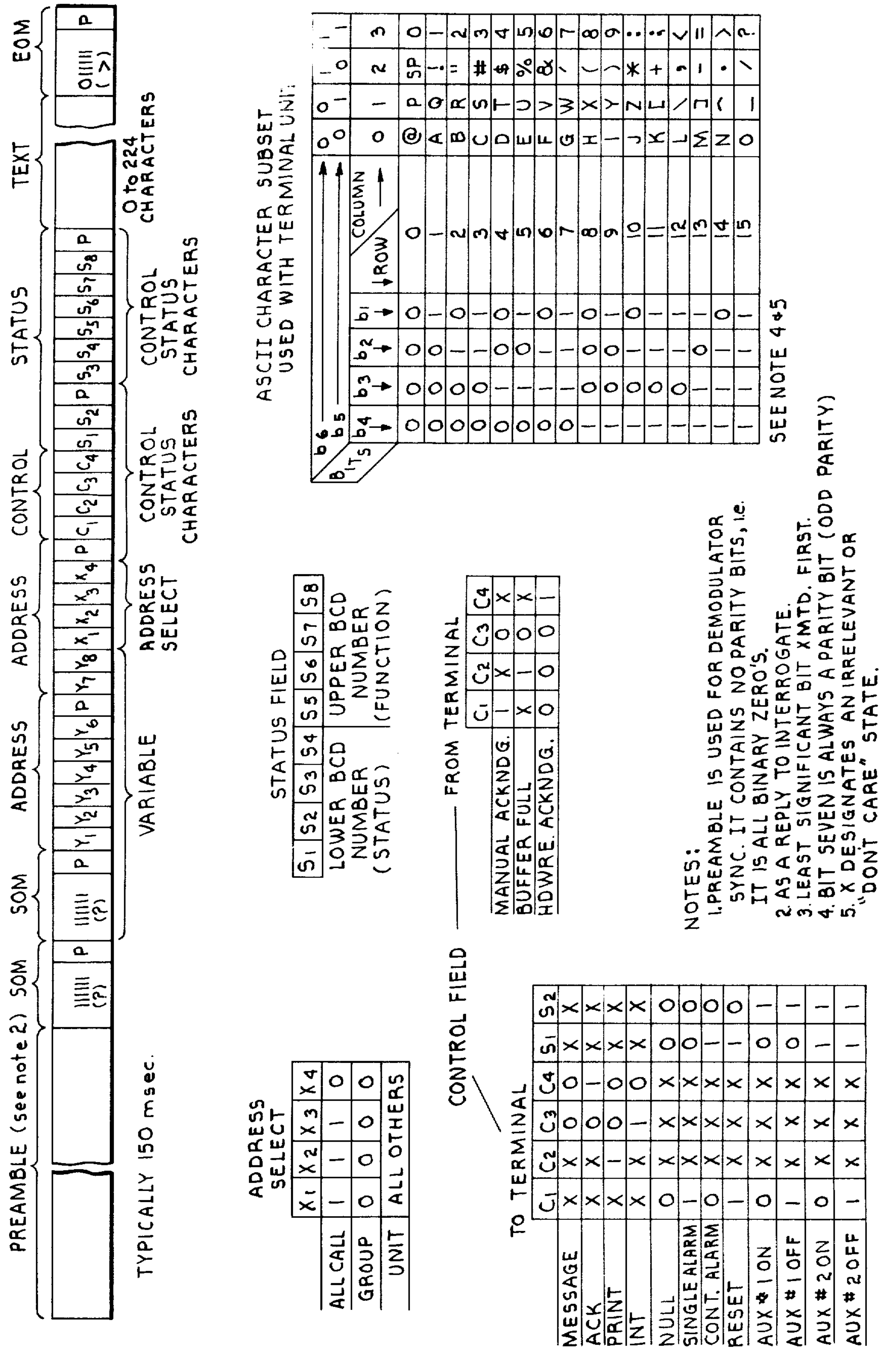
FIG. 7 is a plot of the message format used with the terminal units.

Summarizing the initial operation of the above described circuitry, in order for the receive message format control circuit 112 to continue with the decoding of the message, unit address line 119 must be enabled. The enabling of line 119 may occur in three different ways: (1) an all-call code must be received in the select bit positions X1, X2, X3 and X4 as indicated in FIG. 7; (2) the group call detector 116 may enable the 12 bit unit address, 8 bit group address compare circuit 118 by decoding group call in the address select bits X1, X2, X3 and X4. After the group call enable detector 116 enables compare circuit 118, 118 compares the parallel outputs of shift registers 113 and 114 with the eight bits from the thumb wheel switches and determines their sameness. If the bits are identical, compare circuit 118 has an output signal to gate 120 thereby placing an enable signal on line 119 to the receive message format control circuit 112; and (3) the unit will continue the decoding of the message when a unit address encode exists. This occurs when neither a group call nor an all-call are detected by the detector circuits 116 and 117. In this situation, the compare circuit 118 must indicate that 12 bits in shift register 113 and 114 are the same as indicated by the ten unit address bits on the address card and two straps on the control board.

As indicated, an all-call will correspond to a message sent to all terminals on a radio channel while group call corresponds to a message sent to all terminals on a channel having their group call (the thumb wheel switches) switches preset to the same position. The final condition or unit call message is a message sent to a unique terminal which has a unique address card.

Once the received message format control 112 has received start of message decode and the unit address signal has been enabled, the received message format control 112 continues to verify that the received message is valid. After the start of message and address characters have been checked, the next 14 bits received form the control and status characters. Shift register clock control 115 clocks these 14 bits into shift registers 113 and 114 and gates out all further clock signals to register 114 for the duration of the transmission. As a result, these six bits (C1, C2, C3, C4, S1, S2) are stored in shift register 114.

Figure 8:
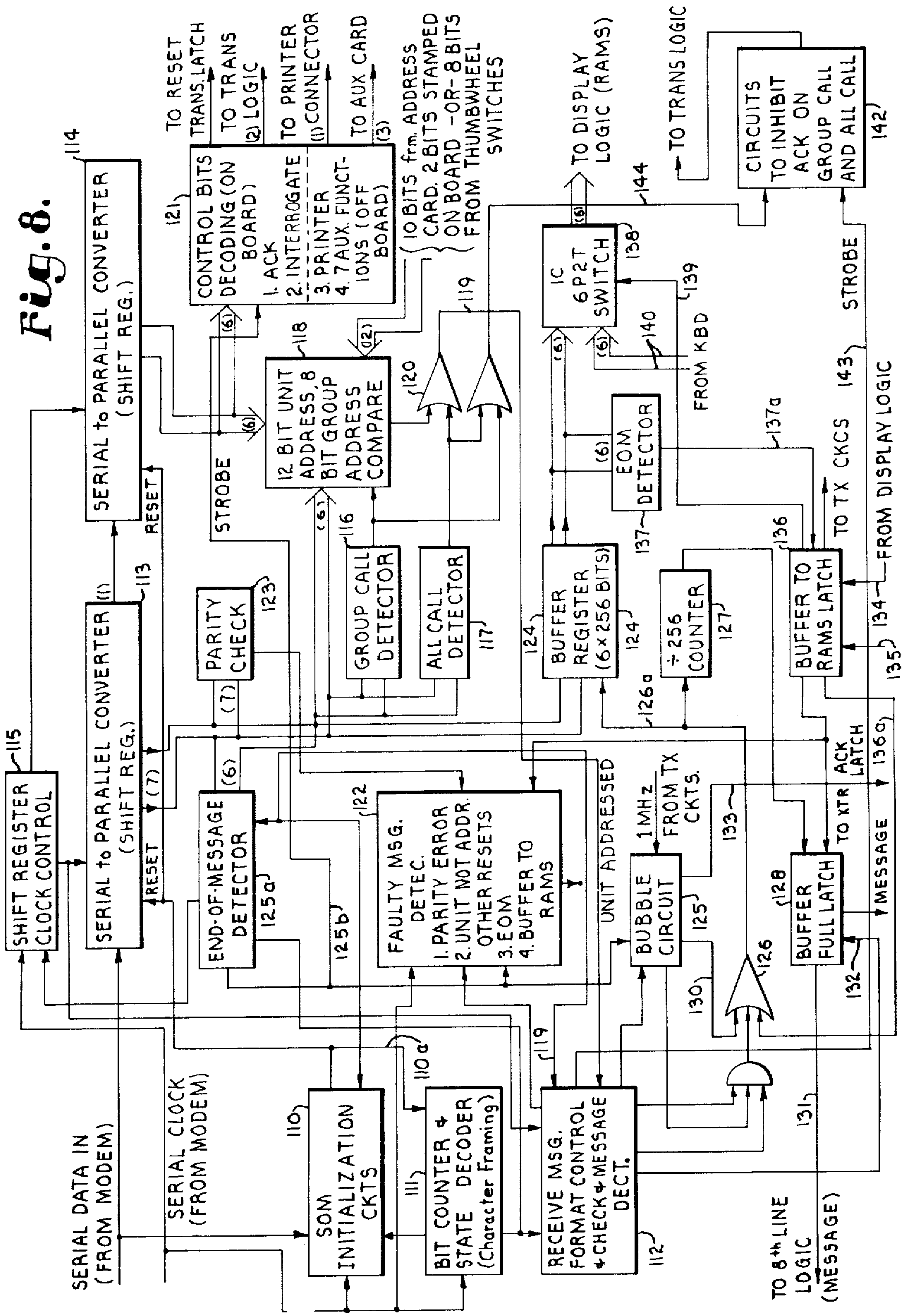
FIG. 8 is a block diagram of the receiver circuitry located on the control board.

Continuing on with the description of FIG. 8, if during the decoding of the address characters or the control status characters, there is any fault detected by the faulty message detect circuit 122 (such as parity error or the unit address error), this detector (122) will reset the receive message format circuit 112 and enable same to anticipate another start of message synchronization from the bit counter and state decoder 111. Faulty message detector 122 receives parity error information from the parity check circuit 123 which being conventionally designed circuitry for accomplishing what its name implies.

If the start of message and address and control status characters have been received with no parity errors and the address characters enable the received message format control, then text may be shifted into buffer register 124 until a valid end of message (EOM) character is decoded by end-of-message detector circuit 125*a*. The buffer register 124 is a 6 by 256 bit static shift register which will hold 256 six bit characters. EOM detector 137 is a combination of gates that decodes the EOM code (shown in FIG. 7) and sets a flip flop thereby enabling the bubble circuit 125. When the EOM is received prior to the 256 character in the text, bubble circuit fills the remaining portion of the buffer register with end of message characters. This is done at a ½ Mhz rate.

A divide by 256 counter 127 counts the total number of clock pulses that are sent to buffer register 124. The low speed clock comes in on line 129 from the receive message format control 112 and actually is derived from the serial clock input (from the modem) divided by seven (which corresponds to the character rate). Bubble circuit has an output corresponding to the ½ Mhz signal mentioned above on line 130 that is gated through gate 126 to the divide by 256 counter 127. Once the counter has received or counted a total of 256 clock pulses from lines 129 and 130, it produces an output signal that sets the buffer full latch 128. This latch has an output on line 131 that is applied back to the bubble circuit to stop the clock pulses at a total of 256 thereby applying exactly 256 clock pulses to the buffer register 124. Accordingly, the buffer register is filled with text information and the extra EOMs that are shifted in on the end of the text fill the excess space in the buffer register. At this point, the buffer full latch 128 is set. The output 132 therefrom is sent to the logic display which illuminates the "MESSAGE" word indicating that the message is stored in the buffer.

The output 133 from bubble circuit 125 is delivered to the transmitter circuitry to indicate that a message has been received and that the transmission of an acknowledgement to the sending party must be accomplished. The signal on line 133 sets the ack flip flop in the transmitter circuitry which will be discussed, infra.

When the end of message character was detected, the end of message detector 125*a* transmits this condition to the control bit decoding circuit 121 via the output line 125*b*. The control bit decoder 121 is enabled and results in the gating of a strobe to the transmitter circuitry, the display logic, the printer connector and the auxilliary board. This strobe indicates that control bits (C1, C2, C3, C4, S1, S2) are ready to be read.

The buffer circuit is now filled with the incoming message and, for the message to be transferred to the display circuitry for display on the SELF-SCAN panel, the operator must depress the clear/display message key. When the above mentioned key is depressed, the display logic enables line 134 and applies a clock to input terminal 135 of the buffer to random access memory (RAMS) latch identified by the numeral 136. The buffer to RAM latch circuit 136 comprises a latch and a clock control gating arrangement which permits the 0.66 Mhz clock that is received on line 135 to be gated to gate 126 via the line 135*a*. Accordingly, a clock input is provided in the buffer register 124 via the line 126*a*. The buffer register shifts one character out to the integrated circuit 6 pole double throw switch 138 for each clock pulse received until the first EOM character is received by the EOM detector, same comprising a gating array to decode the first EOM character. When this decoding occurs, the EOM detector 137 sends a reset signal (via line 137*a*) to a buffer to RAMS latch circuit 136. This reset signal disables the 0.66 Mhz clock from further clocking of buffer register 124.

At this point in the operation, all of the text up to and including the first EOM character has been from the output of buffer register 124 to the IC 6 pole double throw switch 138 which is used to multiplex the incoming data with the data from the keyboard to the display logic RAMS (read only memories). The normal position for this switch is to connect lines 140 (which come from the keyboard) to the display logic RAMS (read only memories). The output from the buffer to RAMS latch 136 (line 129) controls the 6 pole double throw switch 138 in such a manner that it switches its source from the keyboard to the buffer register thus connecting the buffer register 124 to the display logic RAM. While these two are connected, buffer register 124 is clocked until all the text information up to the first EOM character has been transmitted to the display logic and displayed on the SELF-SCAN panel.

As mentioned above, when either a group call or an all-call message is received by the terminal, it must not acknowledge that tranmission. This is because many cars receive an all-call and group call simultaneously and they cannot acknowledge simultaneously as only one unit may transmit at a time and be correctly received. Therefore, the acknowledge is disabled for all group and all-call transmissions which are normally sent several times to make sure that every unit receives them. To inhibit transmitting an acknowledgement for group call and all-call, the circuitry designated by the numeral 142 (a standard flip flop) is normally low must be set. The flip flop, when high, will disable the transmitter logic from transmitting an acknowledgement to the sender of received message. The setting of flip flop circuit 142 occurs by clocking on the line 143 which is derived from the receive message format control circuitry while the group call or all-call detector is enabled on line 144.

CONTROL BOARD TRANSMITTER

Figure 9:
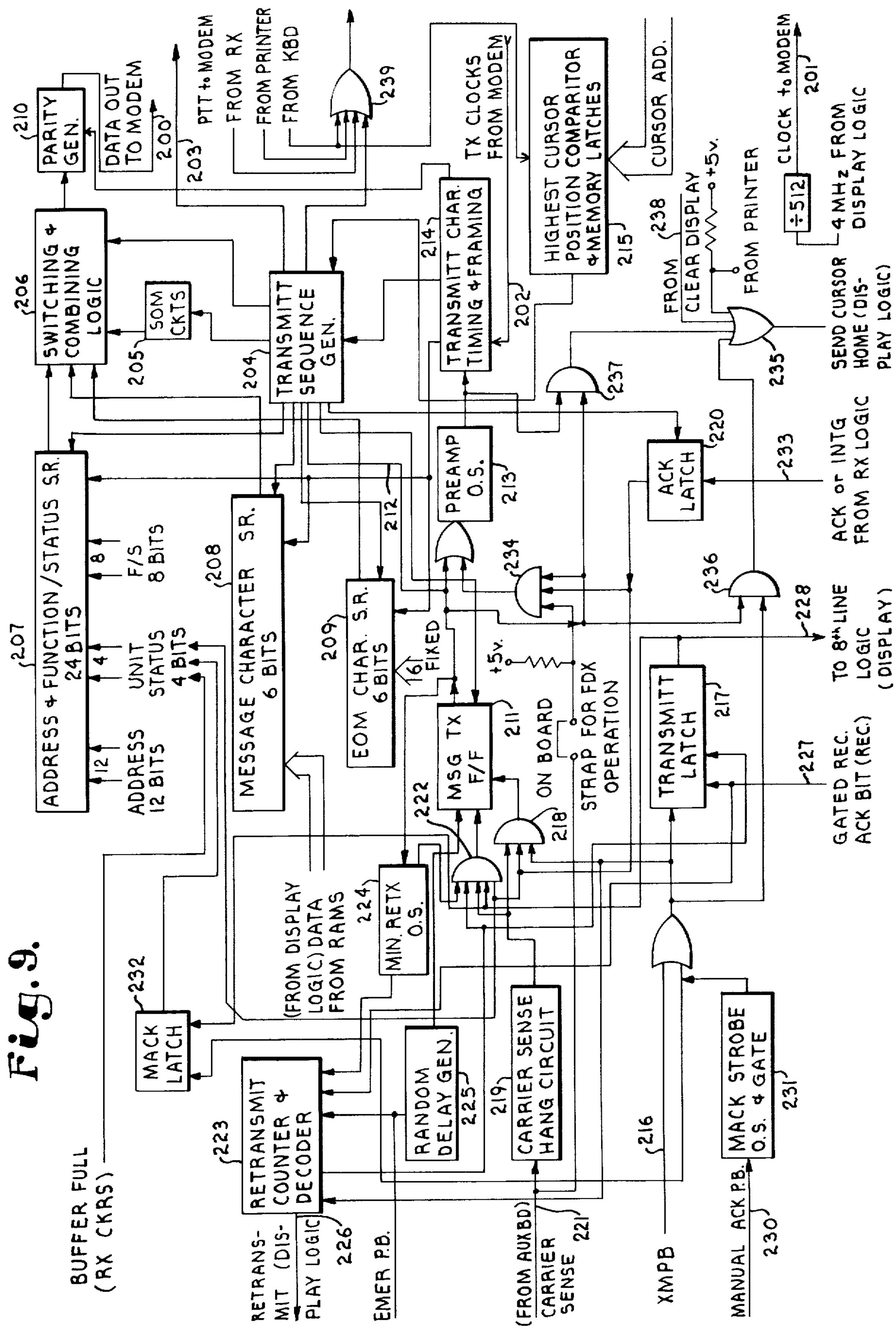
FIG. 9 is a block diagram of the transmitter circuitry located on the control board.
Figure 10:
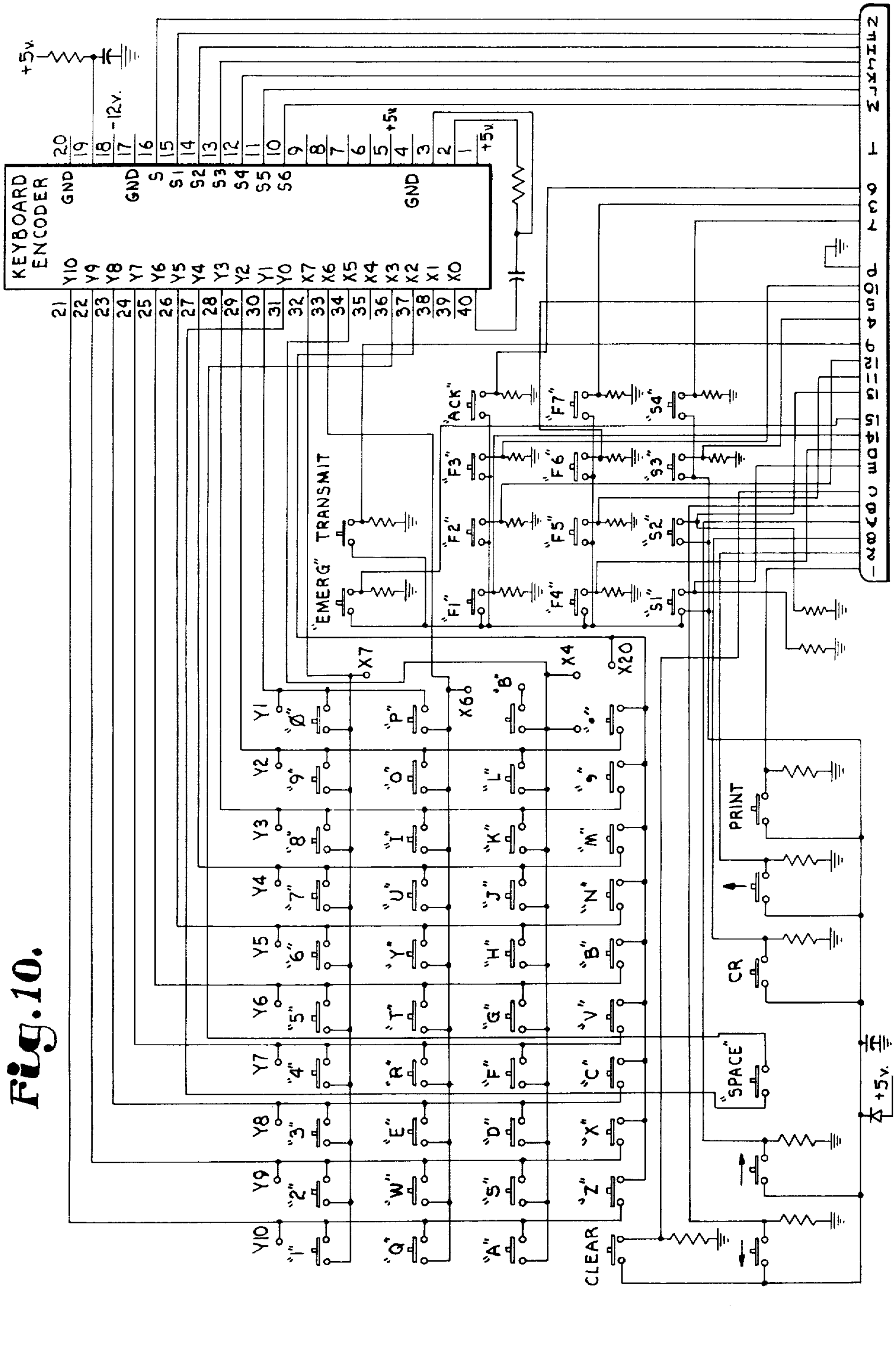
FIG. 10 is a circuit diagram of the key board circuit.

As previously mentioned the control board also includes transmitter circuitry shown herein in block diagram form in FIG. 9. The transmitter circuitry operates to provide the two signals that were required by the modulator to transmit data from the terminal unit to the remote computer (or other terminal units). These two signals are the "data out" to the modem (line 200) and the clock to the modem (line 201). The transmit clock input from the modem is indicated at line 202 and is shows as inputting a transmit character timing and framing circuit 214 which will be described later. The 7800 Hz clock signal that was previously discussed with respect to the mdoulator circuit is the signal output on line 201 while the clock to the modem (on line 202) was referred to as the clock input and was described in terms of a 1300 Hz signal. In any event, the output on line 201 is generated from a 4 Mhz crystal oscillator by dividing the signal by 512 with several binary counters and thereby generating the 7800 Hz signal to the modem.

As will be seen, the remainder of the circuitry in FIG. 9 indicates when to transmit another character on line 200 to the modem and maintains the required synchronization necessary between the modem and the control board.

The "push to talk" signal on line 203 is also required for the modulator to produce the output data signal. This signal switches when data is to be transmitted from a terminal unit and generates the "audio enable" discussed with respect to the modulator block diagram (FIG. 4).

The circuitry including a transmit sequence generator 204, start of message circuit 205, switching and combining logic circuits 206, address and function/status shift register 207, message character shift register 208 and the end of message character shift register 209 are interrelated to perform the proper message output sequencing. The switching and combining logic 206 is a combination of gates that function as a multiplexer and which receive inputs from several sources and combines them into one serial output that will be sent to the modem. At the same time, the transmit sequence generator 204 is a device that operates to instruct the switching and combining logic 206 which data source is to be connected at any particular moment to the modem. Further, the transmit sequence generator is the main control logic block for the transmitter circuitry and controls all output functions, once it receives the necessary initializations from other later described inputs.

As suggested, it is necessary that the message format shown in FIG. 7 is transmitted in the correct sequence. The transmit sequence generator 204 ensures that this will occur and initially connects the start of message circuits 205 to the switching and combining logic 206 so that start of message characters can be transmitted. The transmit sequence generator 204 then deisconnects the start of message circuit 205 and connects the address and function/status shift register 207 so that the address and function status characters may be transmitted through the switching and combining logic 206. Once the address and function status characters have been transmitted, the transmit sequence generator 204 instructs the switching and combining logic 206 to disconnect the shift register 207 and to connected the message character shift register 208 which is the parallel to serial converter and shift register for the message text. Once all the data of importance from the display logic has been transmitted from parallel to serial and sent out to the modem, the message character shift register 208 is disconnected and the end of message character shift register 209 is connected to the switching and combining logic 206 so that the end of message character may be outputted to the modem.

Summarizing the operation described immediately above, the transmit sequence generator operates to control the multiplexing of switching and combining logic circuitry 206 from the start of message circuits, to the address and function status shift register 207, to the message character shift register 208 and from thence to the end of message character shift register in the correct sequence so that the data is correctly sent.

After the switching and combining logic circitry 206 and before the data is sent to the modem, it is gated by the transmit character timing and framing circuitry 214 through the parity generator circuit 210. The parity generator 210 takes the six bit ASCII characters and adds the one bit parity required to each character shown in the FIG. 7 message format. In actual practice, the parity generator utilizes conventional counter circuitry to detect the number of 1s in each ASCII character. If a number of 1s is even, the generator adds a one parity bit and if the number of 1s is odd then the parity bit added is a 0.

Address and function/status shift register 207 is a 24 bit parallel in serial out shift register with the 24 bits being required because there are four characters, two address characters and two control status characters, Ten address bits are inputed from the address card and two address bits are inputed from straps on the control board thus providing the 12 address bits required for a unit address. The other 12 bits transmitted to the shift register are derived from two sources. The first source to be considered is the four bits of "unit status" information while the other source is the eight bits of "function status" information. The eight bits of function status information are provided by the display logic latches which are continually refreshing the two function status numerals on the lower right hand portion of the panel display. This information is in the form of two 4 bit BCD characters to generate a total of eight bits.

Of the four unit status bits mentioned above, only three shall be discussed at this time. One status bit is defined as the "buffer full" bit, another may be defined as the "manual" acknowledge bit and the third is defined as the "hardware" acknowledge bit. Any one of these may be set to indicate the operational status of the terminal when transmission is made. If the buffer full bit is set this indicates that a message is in the receiver buffer (indicated by the setting of circuitry identified by the numeral 128 in the receiver FIG. 8). If the manul acknowledge bit is set, this means that the operator has just pressed the manual acknowledge key on the keyboard and has initiated a manual acknowledge cycle. If the hardware "ack" bit is set, the indication is that the receiver logic has just received the correct transmission (indicated by the set condition of the ack latch 220) and has requested that the transmitter logic output a hardware acknowledge.

Gate 239 has an output going to the display logic cursor read write control and actually the gate performs two functions in that in indicates whether or not the display memory from the receiver logic or from the keyboard is to be written into or whether reading is to be done from the memory for the printer or for a transmit message sequence. This gate sends timing signals to the display logic necessary to bring the parallel six bit characters to the paralle inputs of shift register 208.

As suggested, the display logic is actually a third portion of the control board and is a separate entity yet related to the two other logic groups. This display logic board is essentially that described by the Burroughs Corporation in the "Application Notes" mentioned, supra, with the only changes relating to some redesigning to lower the total component count and the total power consumption. Accordingly the SELF-SCAN panel display and logic circuit for illuminating the dot matrix in the SELF-SCAN panel do significantly interrelate to the overall conception and system approach but are fully disclosed in prior art publications.

The message character shift register 208 is a parallel to serial shift register that receives the six bit ASCII characters from the display logic and converts same into six bit serial characters that are sent to the switching and combining logic 206 for transmission. The end of message character shift register 209 is a six bit shift register whose six inputs are permanently strapped to encode the character as defined in FIG. 7. The transmit sequence generator 204 is the control for the switching and combining logic 206 and requires an indication from the message transmit flip flop 211 that it is the correct time to output a message in order for generator 204 to send the command for switching and combining the various inputs for the output message.

This information from the message transmit flip flop 211 is outputted on line 212 to the transmit sequence generator 204 indicating the proper time to initiate the transmit sequence. When line 212 switches to the enable condition, the generator 204 is instructed to turn on the transmitter thus, the "push to talk" to the modem line 203 is likewise enabled. At the same time, the preamble one shot 213 is fired with the condition on line 212 thereby indicating to the transmit character timing and framing circuit 214 that it is now time to instruct the transmit sequence generator 204 to output the preabmle necessary before the start of message characters are transmitted. After the preamble one shot 213 times out (indicating the end of preamble period), the transmit character timing circuit 214 indicates this condition to the transmit sequence generator 204 which enables the switching and combining lock 206 thereby initiating the transmitting of the start of message characters followed by address and function status and message text and end of message (EOM) characters.

Finally, the transmit sequence generator determines how many characters that the display logic transfers to the message character shift register 208. Since all text information is contained in the display logic, the control circuitry must know how much information in the display logic is to be transmitted. Circuitry, defined as the highest cursor position and comparitor and memory latches 215, instructs the transmit sequence generator 204 how many text characters should be transmitted from the display logic and has eight inputs from the display logic identified as the cursor address input. There is also an input from the keyboard, the keyboard strobe so that at any time the character is inputed to the keyboard, the keyboard strobe strobes comparitor and latches circuit 215 and the contents of the cursor address lines are likewise strobed therein. The comparitor and memory latches 215 determine if this is a higher cursor address than any previously strobed during this input message cycle and therefore will always contain the address of the number of characters that have been placed into the display logic. As a result, this information must be known if all of the text in the display logic is to be transmitted. Anything that is meaningless in the display logic, such as unused memory locations, are not transmitted since the radio channel time is so valuable, no more data than absolutely necessary will be transmitted.

There are 224 usable character locations in the display memory. If only the first ten contain alphanumeric characters, then the comparitor and generator latches 215 will have the number ten stored therein. When the transmit sequence generator 204 sequences the message character shift register 208 into the data stream, it will allow only ten characters to be inputed from the display logic before the generator switches shift register 208 out and the end of message character shift register 209 in. This is a significant automatic feature since it eliminates the officer having to input a special end of message character from the keyboard to indicate to the circuitry that this is all of the text to be sent. Many other prior art terminal devices require that this function be performed manually during the operation of the unit when the text is entered. The above described circuitry performs this function automatically in the circuit 215 which updates to the highest location that the character is entered into from the keyboard thereby allowing trouble free operation without concern for a possible inadvertent omitting of the EOM character.

Prior to the initiation of any transmit cycle, the transmit key must be depressed thereby generating a signal (on line 216) that will set the transmit latch 217. The setting of transmit latch 217 indicates that the transmit key has been depressed and the message transmit flip flop 211 will correspondingly be set, if permitted to by the condition of gate 218. Since one of the three inputs to gate 218 is the same as the input to transmit latch 217, if the other two inputs to gate 218 are enabled when transmit latch 217 is set, gate 218 will allow the message transmit flip flop 211 to be simultaneously set. This condition occurs if carrier sense hang circuit 219 and ack latch 220 are both enabled, same corresponding to the other inputs to gate 218.

The ack latch 220 is set by the receive logic when the receive logic decodes a correct message or a correct message interrogate thus requesting that the transmit circuitry initiate a hardware acknowledge. This indication for acknowledge is shown by the ack latch 220 being set thereby precluding gate 218 from allowing message transmit flip flop 211 to be set by the transmit key. If the carrier sense hang circuit 219 is activated, this condition will also disable gate 218. In actual practice, carrier sense hang circuit 219 is a one shot multivibrator that has an input on line 221 from the auxilliary board. This line indicates a channel busy condition to carrier sense hang circuit 219. Since any time line 221 drops low indicating the channel is free, carrier sense hang circuit 219 (the multivibrator) continues to be high thereby disabling the transmission for a period of time that may be adjusted following any transmission on the channel. This requirement maintains the channel readiness for an acknowledgement from the terminal unit that has just received the message.

It is significant to note that the acknowledgement must have a free channel since it does not check channel activity before being transmitted.

If gate 218 does not set message flip flop 211 when the transmit key line 216 is activated, then the message flip flop will have to be set at a later time by gate 222 in conjunction with circuit 225. The above mentioned gate 222 has inputs from related circuits. For instance, the first input to be considered is the input from transmit latch 217. There are also inputs from the acknowledge latch 220, the carrier sense hang circuit 219 and from two circuits not previously mentioned (e.g. the retransmit counter and decoder 223 and a minimum retransmit one shot 224). The retransmit counter decoder operates as a counter that counts the number of transmissions in any particular transmission cycle. The minimum transmit one shot is the programmable delay that controls the minimum amount of time between adjacent transmissions.

If all five inputs to gate 222 are enabled, it will likewise enable the input to the message transmit flip flop 211. With this input to circuit 211 being enabled, random delay generator 225 may set the message transmit flip flop 211 thereby starting the actual transmission of data.

To review or summarize the above operation, when the transmit key line is activated, the transmit latch 217 is set. If the ack latch 220 and the carrier sense hang circuits 219 are enabled, gate 218 will allow message transmit flip flop to be set simultaneously with transmit latch 217. If either carrier sense hang circuit 219 or the ack latch 220 is disabled, gate 218 will not permit message transmit flip flop 211 to be set at this moment and will require that same is set at a later period determined by the state of five inputs to gate 222 and circuit 225 which will now control when the message transmit flip flop will be set. As suggested, these five inputs are from the transmit latch 217, the ack latch 220, the carrier sense hang circuit 219, the minimum retransmit one shot 224 and the retransmit counter and decoder 223. Typically, the ack latch will be enabled, the transmit latch will be enabled, the carrier sense will be enabled, the retransmit counter and decoder will be set at 0 and will be enabled, the minimum retransmit one shot will be enabled, all allowing gate 222 to be enabled. Thus, the next time that the random delay generator 225 is ready to initiate transmission, the message transmit flip flop 211 will be set thus signalling the preamble one shot 213 to fire and to indicate to the transmit character timing and framing circuit 214 that the preamble is beginning.

Once the preamble ends, the timing and framing circuit 214 indicates this condition to transmit sequence generator 204 which initializes start of message circuits 205 and controls the switching and combining logic 206 to begin switching between the address and function/status, message text, and end of the mesage shift registers 207, 208 and 209 respectively.

A typical operation of actual transmission would include having all five inputs to gate 222 being in the enabled state except for the input from the carrier sense hang circuit 219. The carrier sense hang circuit will be switching high and low intermittently with channel activity (e.g. other terminal units using the channel). If the output from the carrier sense hang circuit 219 is high, a pulse is obtained from the random delay generator 225 thereby causing another transmission to be sent. If the output from the hang circuit 219 is low when the random delay generator fires, no transmission will occur but the random delay generator 225 will cycle once again with the expectation that the carrier sense hang circuit output will be high allowing the next transmission to be initiated. In this manner the transmitting in between existing channel traffic is controlled.

The retransmit counter and decoder circuit 223 counts the number of actual transmissions made in any particular transmit cycle. Once five transmissions have been sent, the output of the retransmit counter 223 is disabled and the transmit latch 217 is reset thereby further disabling gate 222 and restricting all further transmissions unit the transmit key line 216 is again actuated thereby setting transmit latch 217 and resetting the transmit counter and decoder 223. Once the circuit 223 has gone into the retransmit state, line 226 will indicate this condition to the display logic which will in turn light the word "RETRANSMIT" in the bottom line of the display incidating to the operator that five transmissions have gone out but yet no acknowledgement has been received. If at the end of one of the five transmissions, an acknowledgement is received by the receiver circuitry, a signal indicating this will be incoming on line 227 thereby resetting the transmit latch 217 and retransmit counter and decoder 223 thusly inhibiting same from illuminating the "RETRANSMIT" word. When the transmit latch 217 is reset, its output will disable gate 222 thusly eliminating any further transmissions. Also, the setting of latch 217 indicates to the display logic via line 228 that the lighting of the "TRANSMIT" word on the indicator line on the bottom of the SELF-SCAN panel display is accomplished.

Any time line 229 is enabled (which is the emergency push button signal from the keyboard) the random delay generator 225 is instructed to increase in frequency so that the transmissions will go out more rapidly. At the same time, the retransmit counter and decoder is instructed not to stop transmissions after a total of five but to go on indefinitely.

If the operator depresses the manual acknowledge key on the keyboard, line 230 is enabled which correspondingly enables the mack (manual acknowledge) strobe one shot gate 231. The output from the "one shot and gate" 231 is delivered to the transmit latch 217 which initiates a transmit cycle exactly as previously described for the transmit key initiation except that the manual acknowledge bit in the address and function/status shift register 207 is set. In other words, when the manual acknowledge key is depressed instead of the transmit key, the only difference is that the manual acknowledge bit in the first control character is set. This occurs by setting the manual acknowledge latch 232, same being accomplished by the manual acknowledge strobe one shot and gate 31 when the manual acknowledge key is depressed. As long as the manual acknowledge latch 232 is set all outgoing transmissions will contain the manual acknowledge bit in the control positions. Any time the transmit latch 217 is reset (which occurs when line 227 from the receiver circuitry is enbaled) the transmit latch will reset causing manual acknowledge latch 232 to also be reset.

Any time a message is received with the receive logic or any time an interrogate is received with the receive logic, the receive logic will request that the transmitter logic send back an acknowledge. This request enters the control board transmitter circuit via line 233 which sets the acknowledge latch 220. When latch 220 is set, the acknowledge bit into the function/status register 207 is set thereby indicating that the received transmission is an acknowledgement. When the acknowledge latch 220 is set, this indication is received by the preamble one shot 213 from gate 234. After the one shot 213 times out, the transmit character timing and framing circuit 214 indicates to the transmit sequence generator 204 that it is now time to start sending "start of message" characters. Since the transmit sequence generator 204 is directly connected to the message transmission flip flop 211 it is aware that the flip flop 211 is not set and would realize that this transmission is not a message transmission but an acknowledge transmission. Therefore, the sequencing to circuits: start of message circuit 205, address and function status shift registers 207, message character shift register 208 and the end of message character shift register 209 will be initiated by the start of message circuit 205 being connected to the switching and combining logic 206. Following the transmission of two start of message characters, the transmit sequence generator 204 disconnects start of message circuit 205 and connects the shift register 207 to the switch and combining logic 206 thusly allowing transmission of the address and function/-status characters. Following their transmission, the transmit sequence generator 204 connects the end of message character shift register 209 to the switching and combining logic 206 since this is an acknowledge and not a message transmission. Accordingly, the message character shift register 208 is not connected during this cycle.

OR gate 235 has an output going to the display logic and operating to move the cursor to the home position. When the cursor is sent to the home position in the display logic, it goes to the first location in memory. In this situation, and the data received on the six parallel lines coming into the message character shift register 208 starts with the first location in memory and sequences in numerical order through the display memory. Therefore as a requirement for message transmission, the cursor must always be returned to the home position (upper left hand corner) so that the data for the text may be transmitted in the correct sequence or from start to finish as displayed on the SELF-SCAN display panel.

As shown in FIG. 9, the OR gate 235 may initiate the "cursor to home position" by two different logic signals. The first signal emanates from gate 236. If the message transmit flip flop is set when the transmit key is depressed. This condition will occur when the carrier sense hang circuit 219 is enabled and the ack latch 220 is not inhibiting gate 218 at the time that the received transmit signal on line 216 is received. In this situation, the transmit flip flop 211 will be set when the transmit key is depressed thusly allowing gate 236 to enable gate 235 to move the cursor to the home position.

If the carrier sense hang circuit 219 holds gate 218 in the off condition, then gate 237 will send the cursor to the home position at the beginning of the preamble during the first transmission after message flip flop 211 is set. A third input to gate 235 comes from the keyboard and is designated as line 238 and, as such, is generated by the clear/display message key on the keyboard. This input will also operate to move the cursor to the home position but does not initiate the transmit cycle.

The display logic (FIG. 13) described hereafter is also contained on the control board. It is basically the same logic design as that previously mentioned as being developed by Burroughs Corporation with a rather substantial addition. The additional logic enabled the 8th (or bottom line) of the display to be used to indicate both terminal operational status and the function/status controlled by the operator.

As described by the Burroughs "Application Notes" mentioned above, the RAMS 301 are normally directly connected to the character generator 302. However, in order to facilitate using the bottom line for a mode line, a 6 pole 2 throw switch 303 was placed between RAMS 301 and character generator 302. This integrated circuit switch allows the bottom line to be refreshed from the row 8 logic circuit 304 instead of from the RAMS 301 (as are lines 1–7).

Switch 303 has six data inputs from the RAMS 301 and six data inputs from row 8 logic 304. While the top seven lines are being refreshed, the row 8 logic allows the switch to connect circuit 301 to 302. But when the 8th line is being refreshed, circuit 304 uses line 305 to indicate to 303 to switch its inputs to the row 8 logic 304 from the RAMS 303.

Circuit 306 comprise the refresh address counters and inform row 8 logic 304 what line is being refreshed. Circuit 304 contains a read only memory (ROM) and associated gating circuits. The ROM has the following words "stored" therein: "MESSAGE, " "TRANSMIT", and "RETRANSMIT". When the appropriate signals are generated on lines 307, 308 and 309 these words may be refreshed on the eighth line. Line 307 is the message line control from the receive circuitry. Line 308 is the transmit line control from the transmit circuitry and line 309 is the retransmit line control from the transmit circuitry. When any of the three lines are enabled the corresponding word is illuminated on the bottom of the display by the row 8 logic 304 which sends the correct 6 bit ASCII code to the character generator 302 at the correct time.

The row 8 logic always displays the letters "F/S". These are followed by two decimal numbers which are determined by the contents of the latches $309_a$ and 310. These latches are updated by the function strobe line 313 and status strobe 312 from the diode matrix 311. When a function or status key is depressed on the keyboard, one of the eight input lines to 311 will switch low and a function strobe 313 or a status strobe 312 will occur. The particular input activated to the diode matrix 311 determines the 4 bit ASCII code generated on its output. The strobe received indicates whether a function or status key was depressed thereby updating the correct set of latches which updates the mode line numerals in the lower right corner of the screen.

From the foregoing, it will be seen that this invention is one well adapted to attain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:

1. In a mobile terminal computer system having a plurality of mobile terminal units, a base radio and a computer data base, the improvement comprising:

said mobile terminal unit including means for encoding, transmitting, receiving and decoding digital data means for communicating said digital data between said terminal unit, said base radio and said computer data base thereby facilitating terminal unit dispatching, unit status updating and computer information retrieval without voice communication, means for automatically transmitting an acknowledgement to said computer data base that digital data has been received by said mobile terminal unit, and means for transmitting an operator acknowledgement to said computer data base that said digital data is received by said termainal unit operator.

2. A mobile terminal computer system, said system comprising a plurality of mobile terminal units, each of said units including means for encoding, transmitting, receiving, and decoding digital data relating to its specific information, said unit further including means for visually displaying said data to be transmitted or received in alphanumeric characters, said displaying means having means for editing said data prior to said data being transmitted, a base radio, said radio operable to transmit and receive said data to and from said mobile terminal unit, a computer data base, a communications network means for effecting data communication between said base radio and said computer data base, said mobile terminal unit thereby obtaining said information from said computer data base by utilization of said transmitting and receiving means, said displaying means, said base radio and said communications network, and said system including means for automatically acknowledging the receipt of a message from either said data base to said terminal unit or from said terminal unit to said data base.

3. The combination as in claim 2 wherein said displaying means has a plurality of display lines, each of said lines being capable of displaying information data in alphanumeric characters and means for utilizing one of said display lines for a mode line to thereby indicate an operational state of said terminal unit.

4. The combination as in claim 3 wherein said displaying means has a display memory and a logic circuit having an output therefrom for controlling the displayed information on said mode line, means for detecting when the display is refreshing said mode line and means for switching the source of data from the display memory to said mode line logic circuit thereby permitting said mode line to indicate said operational state.

5. The combination as in claim 2 wherein said terminal unit transmitting means includes a means for automatically waiting for a radio channel to be free and to randomly space adjacent transmission thereby decreasing the probability for interference with other terminals in the same system.

6. The combination as in claim 5 including means for minimizing the probability of cochannel interference, said probability minimizing means indicating that the channel is clear for transmission, and means for insuring separation of terminal unit cochannel users.

7. The combination as in claim 6 including means for insuring that the channel is free for a return message acknowledgement to another unit or to said computer initiating the message.

8. The combination as in claim 2, wherein said terminal unit includes a means for transmitting function and status information from said terminal unit to said computer data base on command of the computer.

9. The combination as in claim 8 including means for transmitting terminal unit operational status from said terminal unit to said computer data base on command of said computer, said unit status including an indication of the terminal unit memory buffer condition.

10. The combination as in claim 2 including means for manually acknowledging a message received by said terminal unit, said manual acknowledgement thereby indicating the terminal unit operator's comprehension of the received message.

11. The combination as in claim 2 wherein said terminal unit includes means for automatically acknowledging the receipt of a message from said computer data base under preselected conditions, said acknowledging means including a means for transmitting function and status information and the operational state of said terminal unit.

12. The combination as in claim 2 wherein said terminal unit includes a means for transmitting function and status information from said terminal unit to said computer data base upon command of said computer.

13. The combination as in claim 2 wherein said terminal unit has a display memory, and means for transmitting only meaningful data in said display memory without requiring that a special character be entered in said memory to indicate an end of message.

14. The combination as in claim 13 wherein said display has a means indicating the last data entered into the memory, and means for insuring that said meaningful data transmitting means transmits only information up to said last data entry.

15. The combination as in claim 14 wherein said terminal unit includes a means for transmitting function status information from said terminal unit to said computer data base upon command of said computer.

16. The combination as in claim 15 wherein said terminal unit includes a means for automatically acknowledging the receipt of a mesage from said computer data base under preselected conditions.

17. The combination as in claim 2 wherein said system includes an auxiliary device having the capability of recording information sent to said terminal unit and wherein said terminal unit includes a means for indicating to said auxiliary device that the terminal unit is in standby thereby permitting said auxiliary device to receive information intended for the terminal unit.

18. The combination as in claim 17 including means for clearing a memory associated with said terminal unit after said auxiliary device receives all information thereby allowing said terminal unit to receive additional information intended thereto.

* * * * *

UNITED STATES PATENT OFFICE
CERTIFICATE OF CORRECTION

PATENT NO. : 3,899,772

DATED : August 12, 1975

INVENTOR(S) : MEAD, ALAN B.; AKER, JOHN L.; MALAN, DAVID A.; & ALDEN, JOHN R.

It is certified that error appears in the above-identified patent and that said Letters Patent are hereby corrected as shown below:

Col. 1, line 2, change "relates" to --related--; line 20, "vasts" to --vast--; line 41, "message" to --messages-; line 56, "terminals" to --terminal--; line 61, "date" to --data--; line 64, "tha" --that- Col. 2, line 25, "of" to --or--;
Col. 3, line 13, "dispaly" --display--; line 51, "feaature" to --feature--.
Col. 4, line 13, "trasnmission" to --transmission--; line 25, "construced" to --constructed--;
Col. 6, line 1, "sytem" to --system--.

Col. 10, line 16, "dispaly"--display--;line 59, "work" --word--.
Col. 11, lines 3&4, "transit" to --transmit--; line 21, "messaage" to --message--; line 55, "auxilliary" to --auxiliary--.
Col. 12, line 30, "bazck" to --back--

Col. 15, line 33, "reference" to --reference--.

Col. 24, lines 66-67, "opeprates" to --operates--.
Col. 25, line 6, "shows" to --shown--; line 9, "mdoulator" to --modulator--; line 53,"deisconnects" to --disconnects--; line 61, "connected" to --connect--.
Col. 26, line 12, "circitry" to --circuitry--; line 27, "," to --.--
line 62, "in" to --it--;
line 67, "paralle" to --parallel--.
Col. 27, line 38, "preabmle" to --preamble--.
Col. 30, line 10, "unit" to --until--; line 16, "incidating" to --indicating--; line 57, "enbaled" to --enabled--.
Col. 31, line 33, delete "and".
Claim 1, line 18, "termainal" to --terminal--.
Claim 5, line 4, "transmission" to --transmissions--.

Signed and Sealed this

*sixteenth* Day of *December 1975*

[SEAL]

*Attest:*

RUTH C. MASON
*Attesting Officer*

C. MARSHALL DANN
*Commissioner of Patents and Trademarks*